(12) United States Patent
Middler

(10) Patent No.: US 12,151,187 B2
(45) Date of Patent: Nov. 26, 2024

(54) FLUID FILTERING SYSTEM WITH BACKFLUSH VALVE AND METHODS OF OPERATING THE SAME

(71) Applicant: NORDSON CORPORATION, Westlake, OH (US)

(72) Inventor: Robert Middler, Havixbeck (DE)

(73) Assignee: Nordson Corporation, Westlake, OH (US)

( * ) Notice: Subject to any disclaimer, the term of this patent is extended or adjusted under 35 U.S.C. 154(b) by 471 days.

(21) Appl. No.: 17/609,031

(22) PCT Filed: May 15, 2020

(86) PCT No.: PCT/US2020/033035
§ 371 (c)(1),
(2) Date: Nov. 5, 2021

(87) PCT Pub. No.: WO2020/232322
PCT Pub. Date: Nov. 19, 2020

(65) Prior Publication Data
US 2022/0212129 A1 Jul. 7, 2022

Related U.S. Application Data

(60) Provisional application No. 62/848,456, filed on May 15, 2019.

(51) Int. Cl.
*B01D 29/66* (2006.01)
*B01D 29/01* (2006.01)
*B01D 39/12* (2006.01)

(52) U.S. Cl.
CPC ........... *B01D 29/668* (2013.01); *B01D 29/01* (2013.01); *B01D 39/12* (2013.01)

(58) Field of Classification Search
CPC .... B01D 29/665; B01D 29/01; B01D 29/668; B01D 39/12
(Continued)

(56) References Cited

U.S. PATENT DOCUMENTS 4,315,963 A 2/1982 Havens
4,676,851 A 6/1987 Scheibner et al.
(Continued)

FOREIGN PATENT DOCUMENTS

AU 2001276967 A1 5/2002
CN 201551882 U 8/2010
(Continued)

OTHER PUBLICATIONS

Middler, WO 2013182192 A1, English Machine Translation, pp. 1-9 (Year: 2013).*

(Continued)

*Primary Examiner* — Claire A Norris
(74) *Attorney, Agent, or Firm* — Baker Hostetler

(57) ABSTRACT

In one example, a filtering device has a housing that defines an inlet opening, first and second bores with first and second pistons therein, respectively, first and second inlet channels that extend from the inlet opening to the first and second bores, respectively first and second outlet channels in communication with the first and second bores, respectively, and a first backflush channel. The first piston defines a filter cavity in fluid communication with the first inlet and outlet channels when the first piston is in a production mode. The second piston defines a filter cavity in fluid communication with the second inlet and outlet channels when the second piston is in the production mode. The device has a backflush valve that compresses fluid into the filter cavity of the first piston via the first backflush channel to increase pressure in the cavity during a backflushing operation.

25 Claims, 16 Drawing Sheets

(58) Field of Classification Search
USPC .......................................................... 210/791
See application file for complete search history.

(56) References Cited

U.S. PATENT DOCUMENTS

| | | | |
|---|---|---|---|
| 4,732,727 | A | 3/1988 | Havens |
| 2005/0269733 | A1 | 12/2005 | Pawloski |
| 2014/0197092 | A1 | 7/2014 | Hartmann et al. |
| 2014/0263028 | A1 | 9/2014 | Middler et al. |
| 2015/0014238 | A1 | 1/2015 | Pohl |
| 2016/0317954 | A1 | 11/2016 | Middler |

FOREIGN PATENT DOCUMENTS

| | | |
|---|---|---|
| CN | 103687655 A | 3/2014 |
| CN | 104203364 A | 12/2014 |
| DE | 2126366 A1 | 12/1972 |
| DE | 19730574 C1 | 4/1998 |
| DE | 202004020442 U1 | 6/2005 |
| DE | 102005037268 A1 | 2/2006 |
| DE | 102011051373 A1 | 12/2012 |
| DE | 102012104924 A1 | 12/2013 |
| DE | 102012104939 A1 | 12/2013 |
| DE | 102014016634 A1 | 5/2016 |
| DE | 202015009090 U1 | 9/2016 |
| EP | 0875357 A1 | 11/1998 |
| EP | 1762364 A2 | 3/2007 |
| JP | 46-021177 Y1 | 7/1971 |
| JP | 61-209135 A | 9/1986 |
| JP | 2001-521458 A | 11/2001 |
| WO | 98/47688 A1 | 10/1998 |
| WO | 2013/182192 A1 | 12/2013 |
| WO | 2013/182193 A1 | 12/2013 |
| WO | 2016/074780 A1 | 5/2016 |

OTHER PUBLICATIONS

IPEA/409—International Preliminary Report on Patentability Mailed on Nov. 25, 2021 for WO Application No. PCT/US20/033035.

ISA/220—Notification of Transmittal or Search Report and Written Opinion of the ISA, or the Declaration Mailed on Sep. 2, 2020 for WO Application No. PCT/US20/033035.

\* cited by examiner

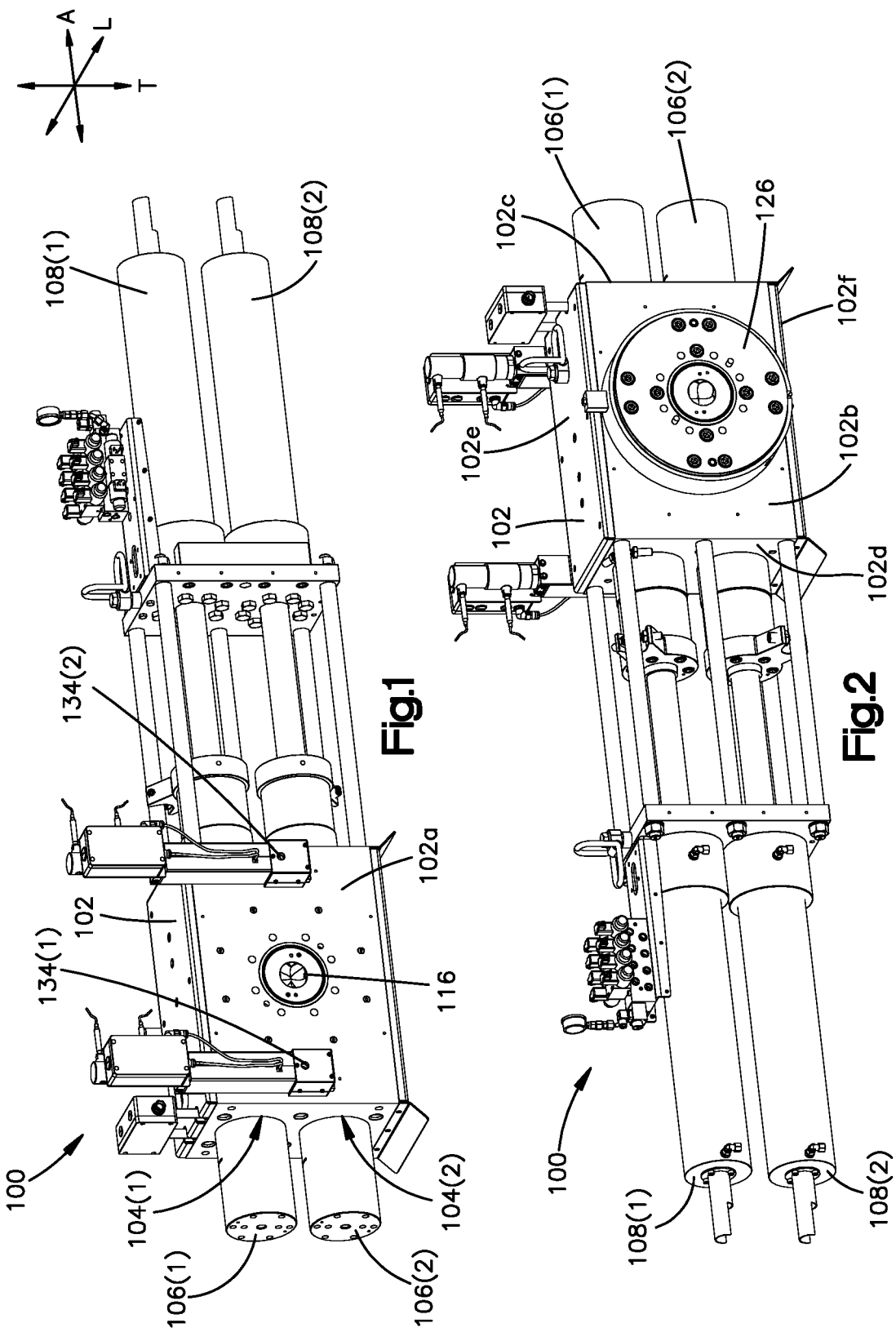

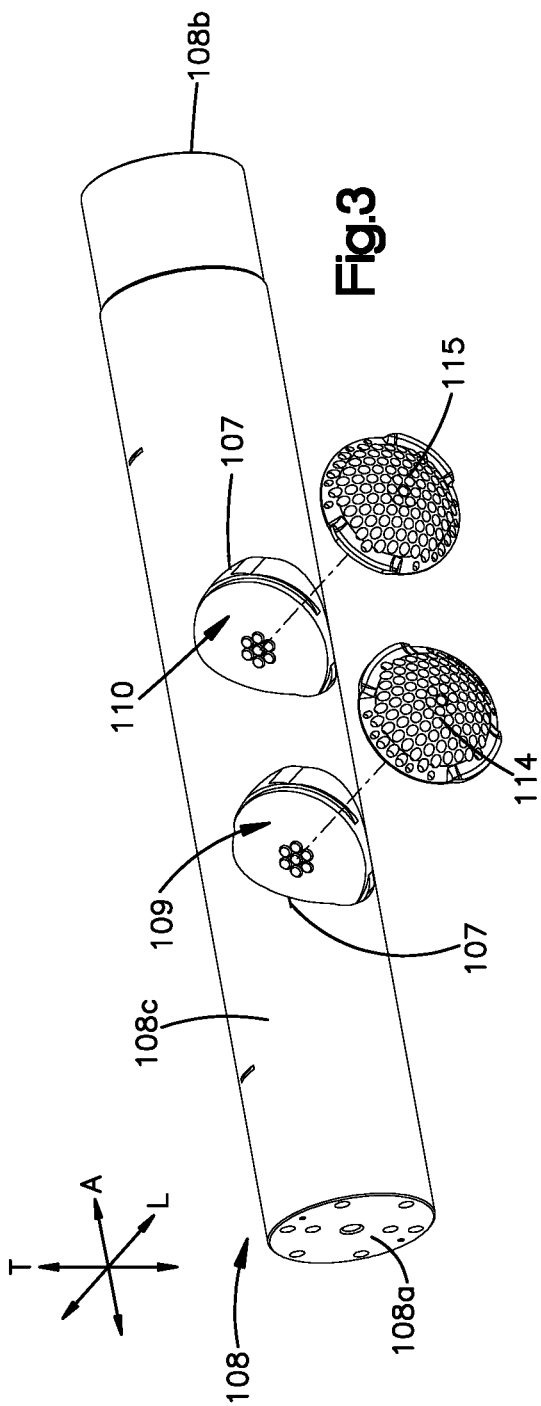
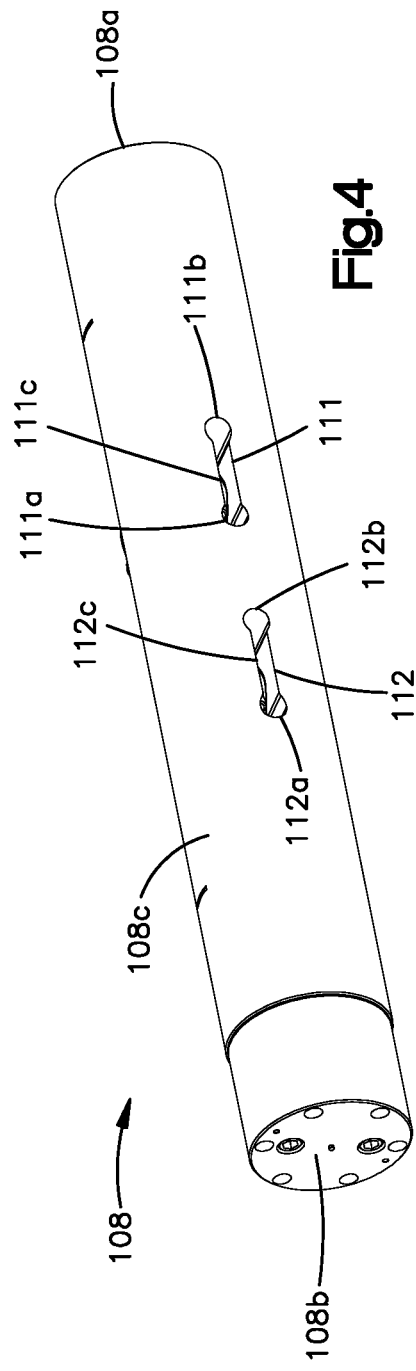

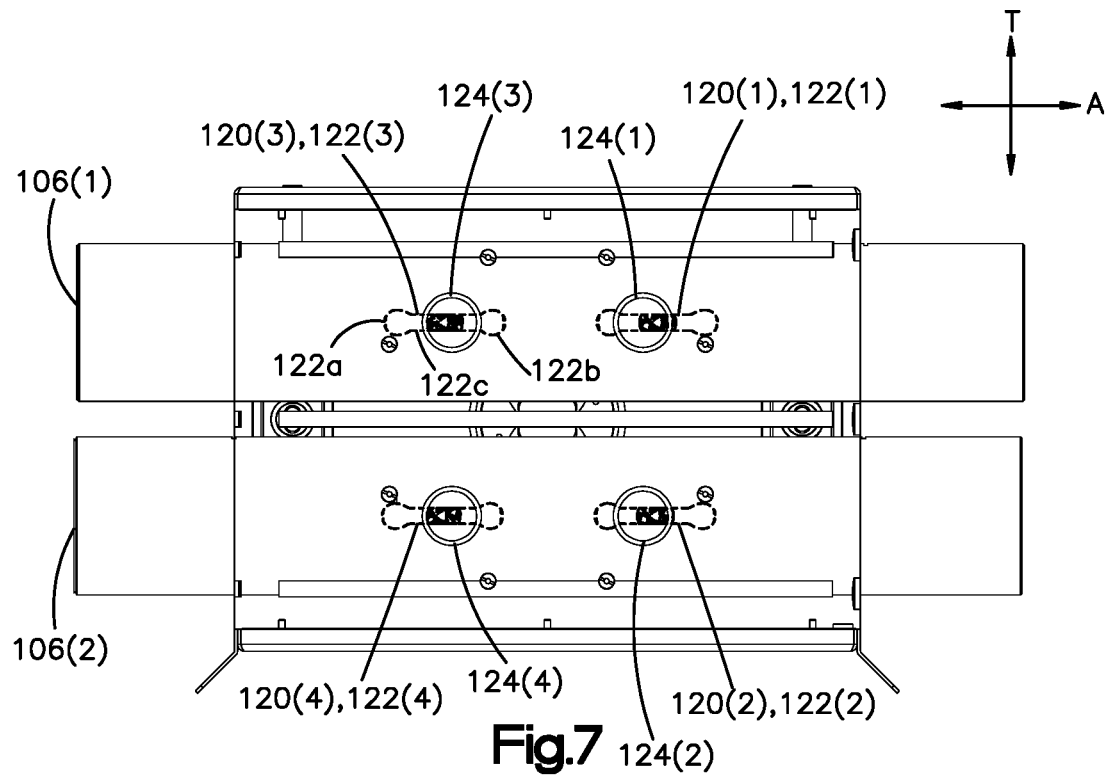
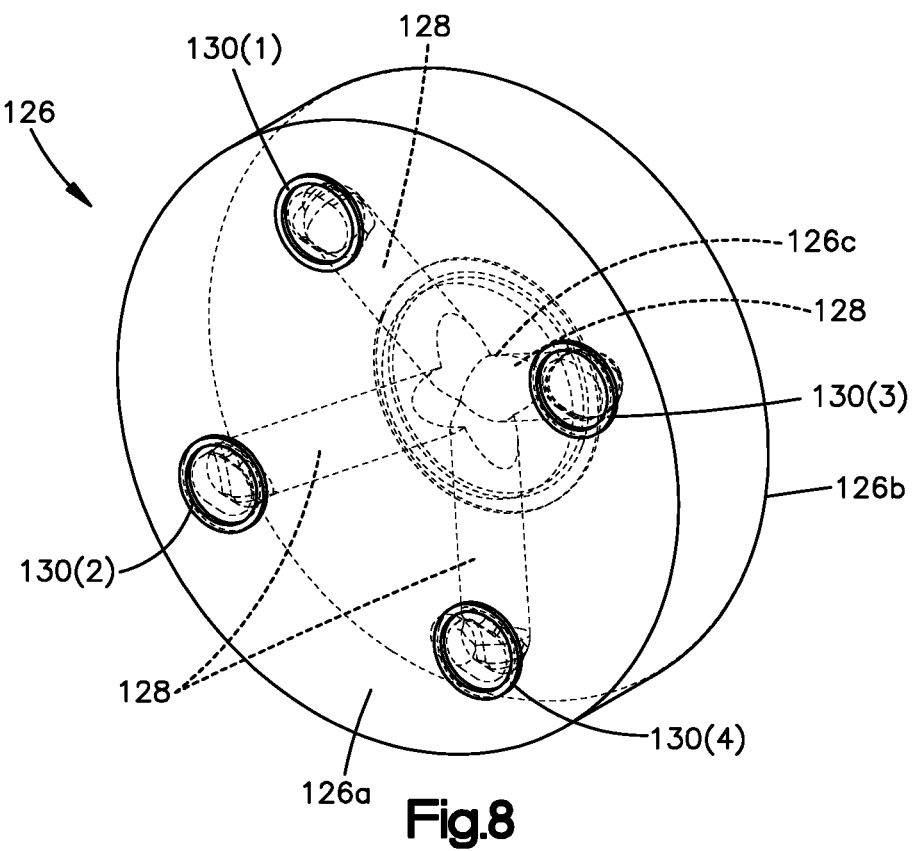

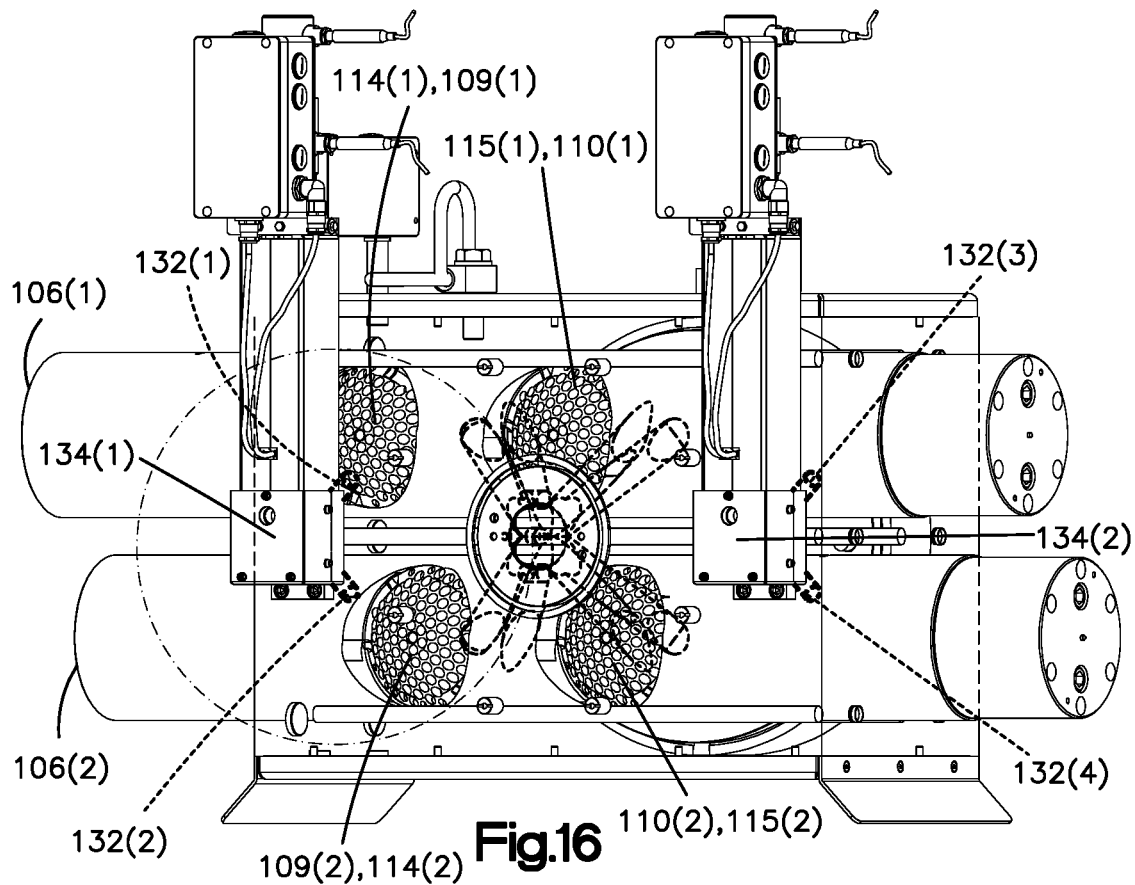
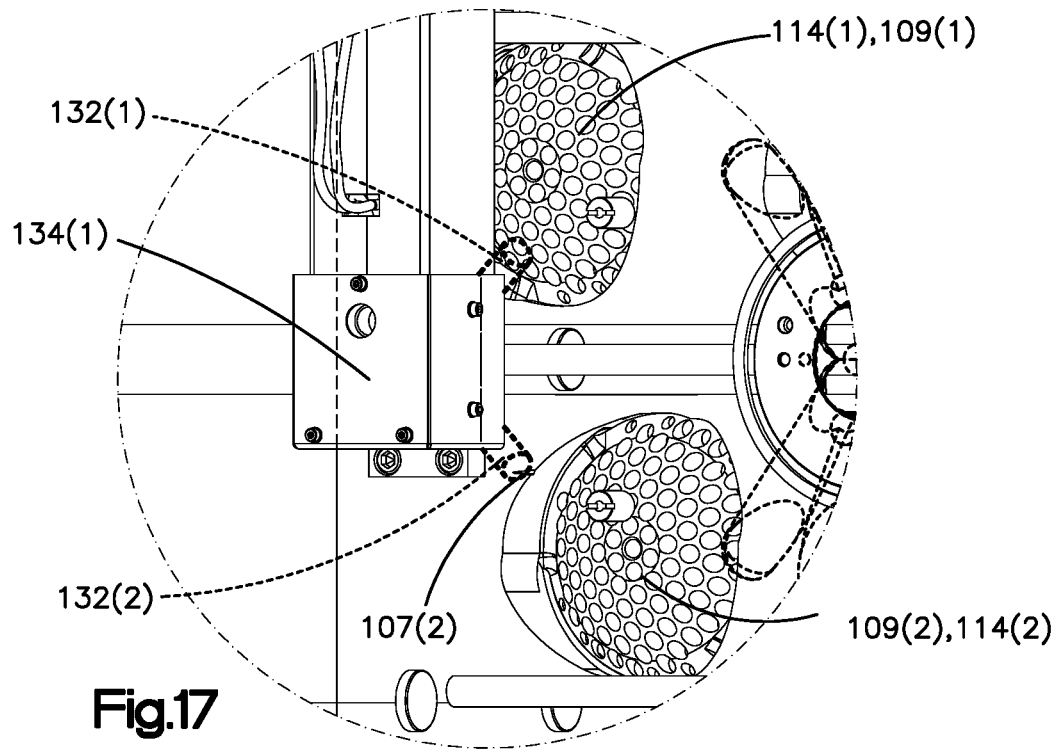

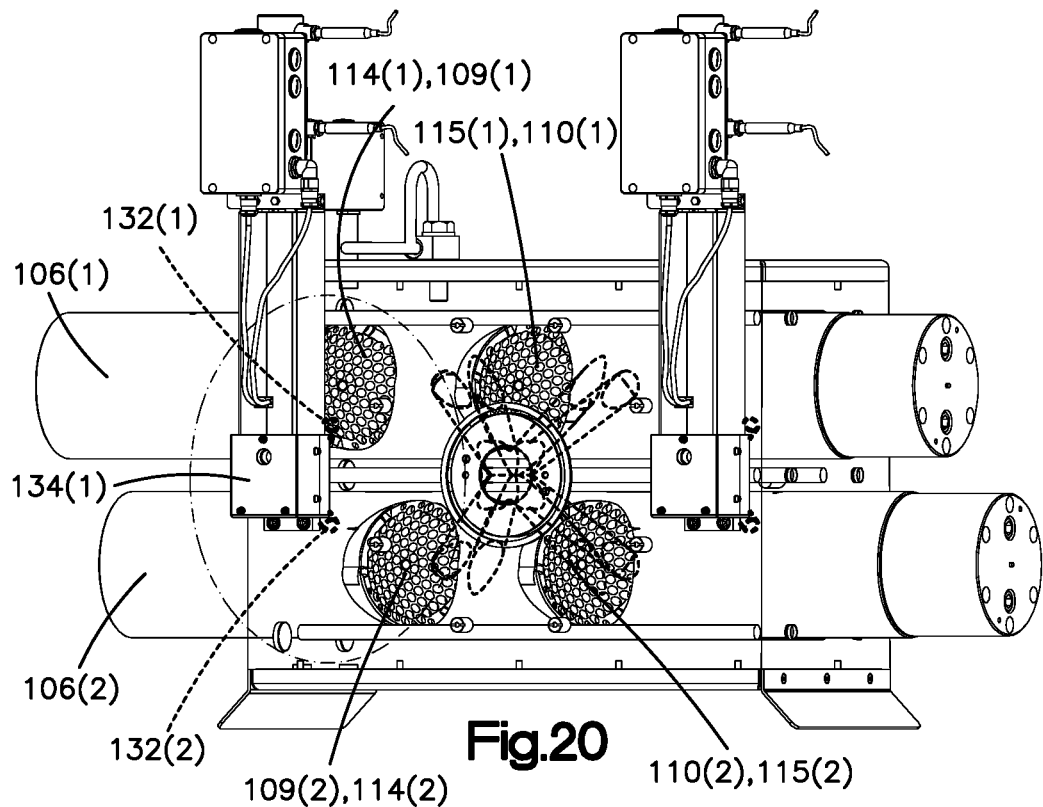
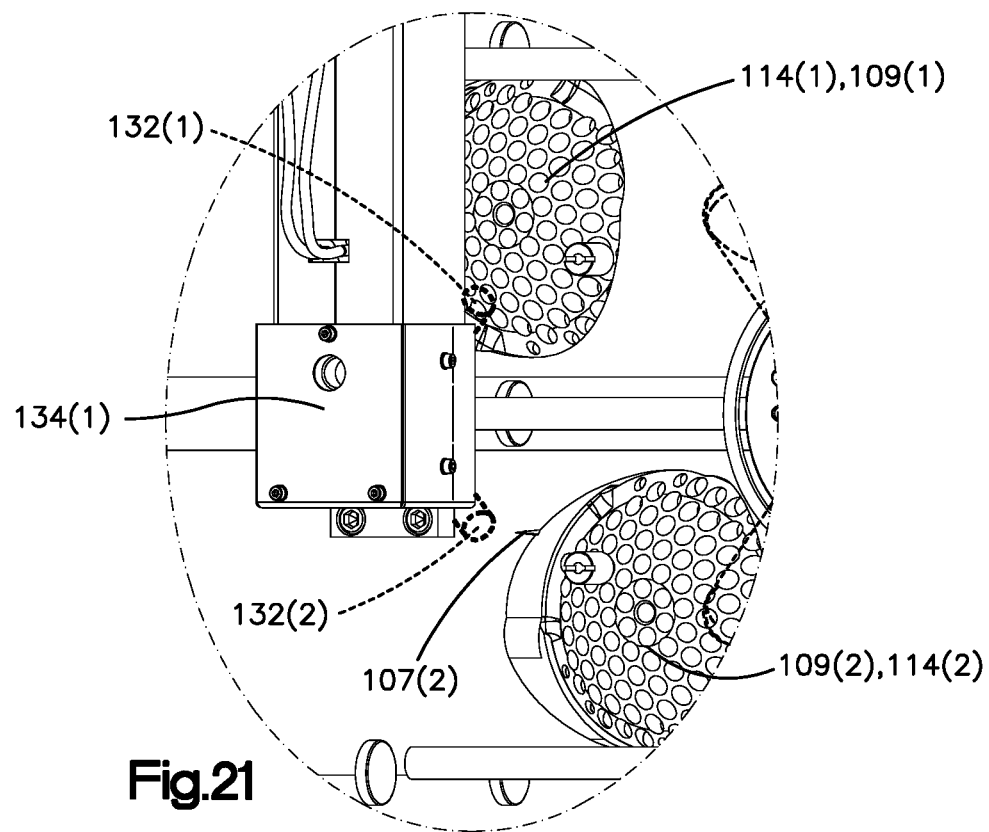

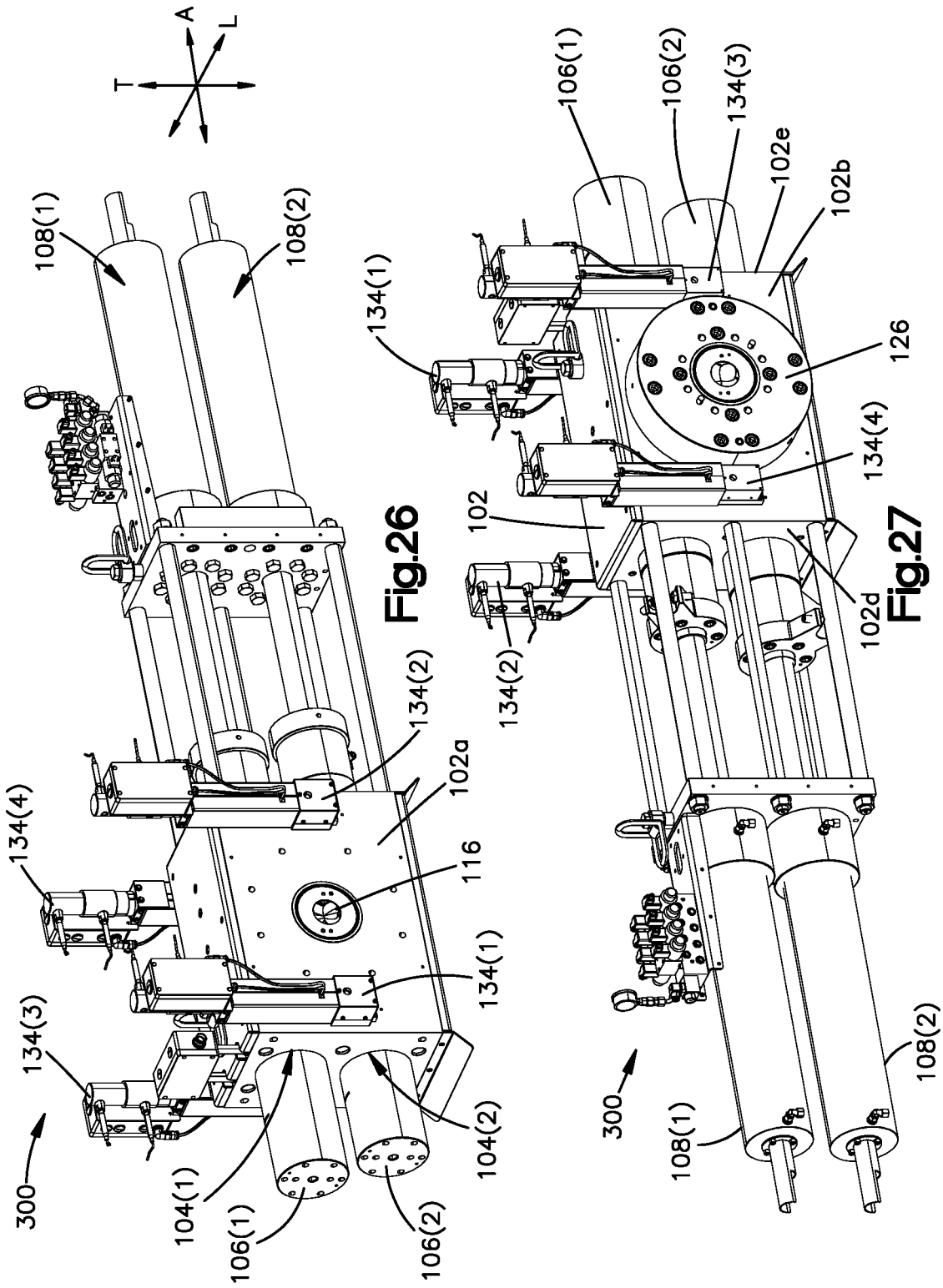

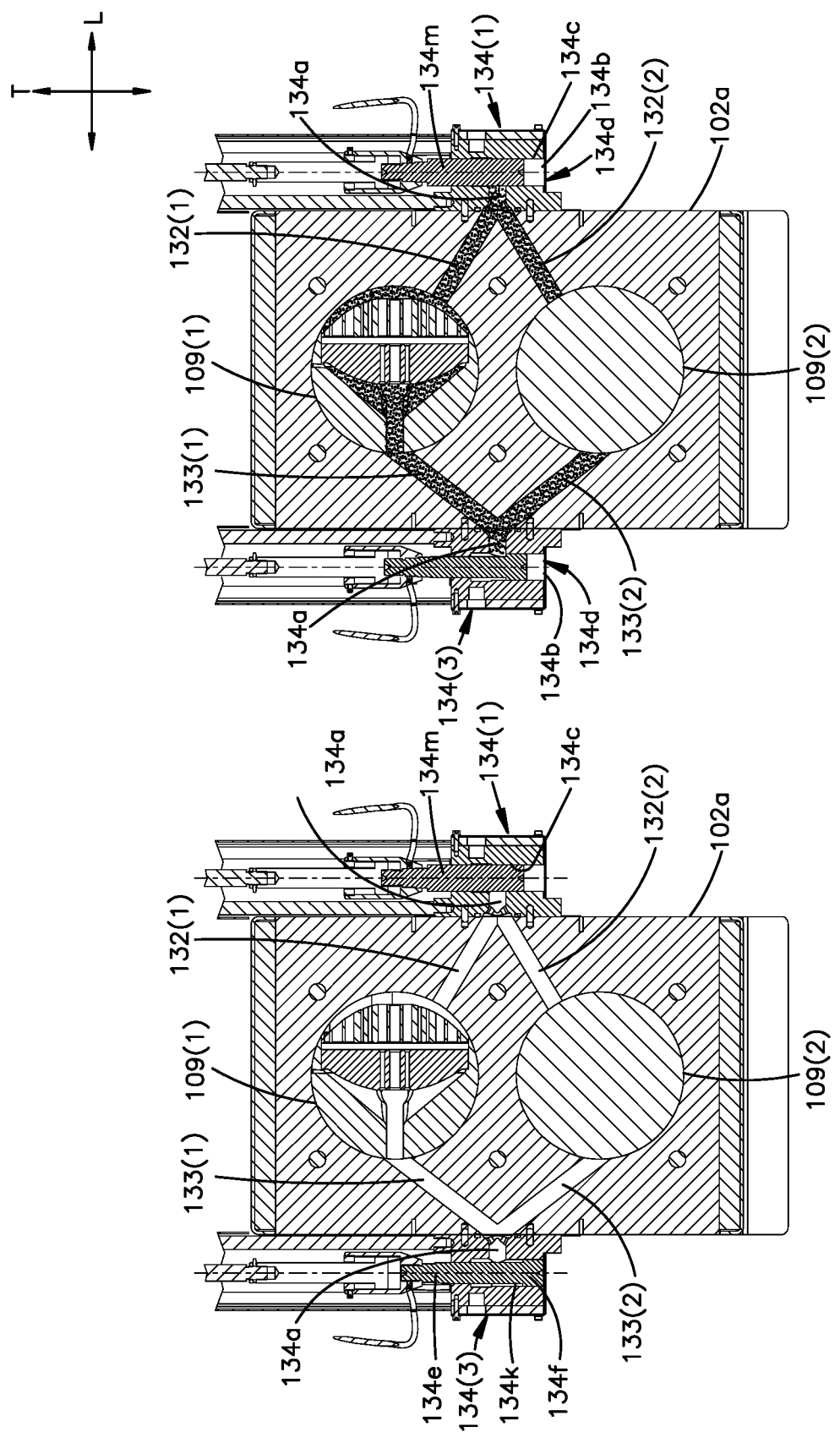

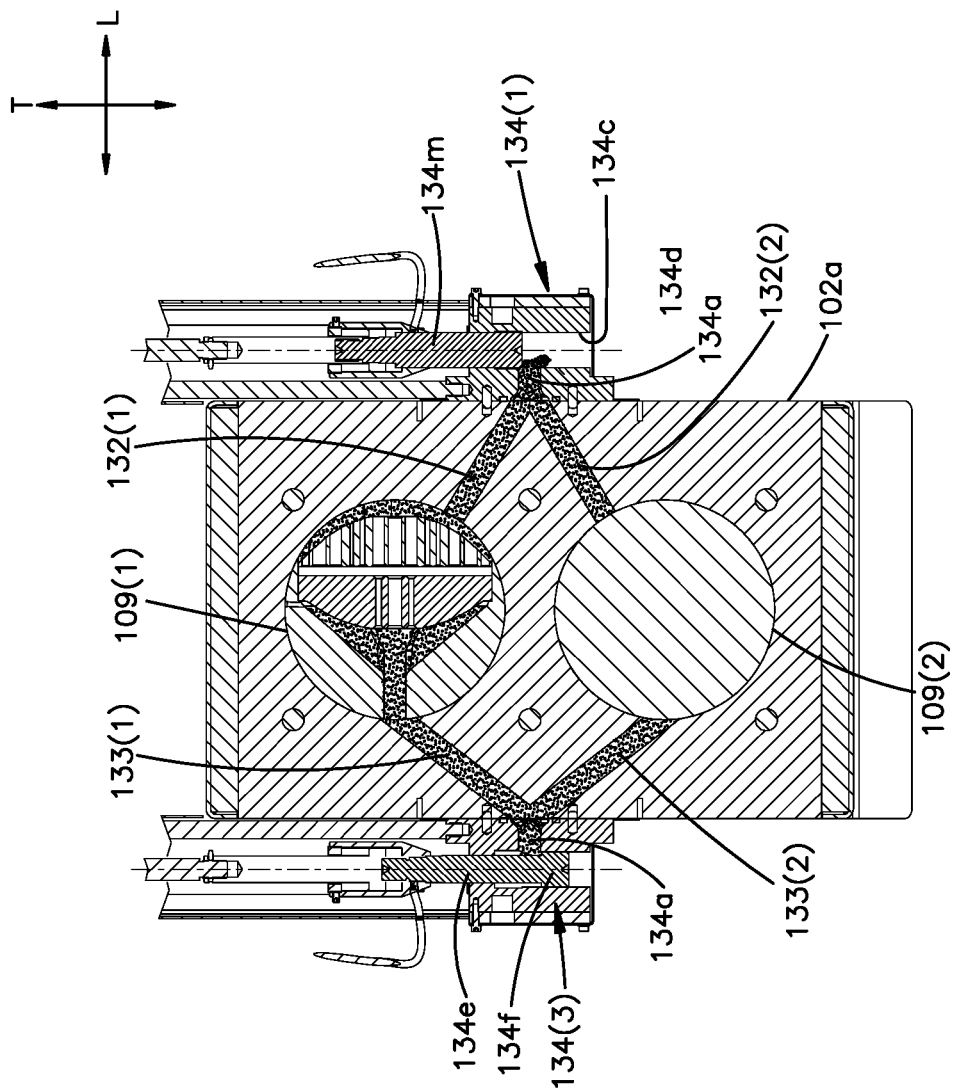

FLUID FILTERING SYSTEM WITH BACKFLUSH VALVE AND METHODS OF OPERATING THE SAME

CROSS-REFERENCE TO RELATED APPLICATIONS

This application is a National Stage Application of International Patent App. No. PCT/US2020/033035, filed May 15, 2020, which claims the benefit of U.S. Provisional Patent App. No. 62/848,456, filed May 15, 2019, the entire disclosures of both of which are hereby incorporated by reference as if set forth in their entirety herein.

TECHNICAL FIELD

This disclosure generally relates to filtering systems for filtering fluids, such as high-viscosity fluids, and in particular, to systems and methods for cleaning filter elements of filtering systems.

BACKGROUND

A filtering device, known as a piston type screen changer, is commonly used for filtering high-viscosity media such as plastic melts. The filtering device typically has a housing, feed channels, and a pair of pistons arranged movably in the housing. Each of these pistons has at least one cavity, and at least one filter element or screen is disposed in each cavity. In a production mode of operation, the feed channels in the housing branch off towards the cavities in such a way that melt is guided through the respective filter elements. Provided behind the filter element, when viewed in the direction of flow, are outlet channels through which the plastic melt is discharged. The outlet channels are combined at some point in the housing. When flowing the melt through the at least one filter element, impurities and agglomerations in the melt can become embedded in the at least one filter element.

The filtering device with two pistons bearing the filter elements and being movable in a direction basically perpendicular to the flow-through direction of the fluid has several advantages. One of these is that the piston is not only a filter carrier but closes and opens flow paths with its movement so that no additional valves are needed. By a suitable design of flow channels, the piston can be moved from a production mode of operation into a backflushing mode of operation. In the backflushing mode of operation, the fluid is led from a downstream side of a filter element and through the filter element in a reverse flow direction (i.e., upstream direction) in order to detach impurities stuck to the filter and to flush them out of the housing. Furthermore, the piston can be partially moved out of the housing in order to give access to a filter element when cleaning or replacement thereof has become necessary.

SUMMARY

In one example, a filtering device configured to filter a fluid comprises a housing, first and second pistons, first and second filter elements, and a backflush valve. The housing defines at least one inlet opening, first and second bores, at least one first inlet channel extending from the at least one inlet opening to the first bore and at least one second inlet channel extending from the at least one inlet opening to the second bore, first and second outlet channels in communication with the first and second bores, respectively, and first and second backflush channels. The first and second pistons are movably disposed in the first and second bores, respectively. The first piston defines a first cavity therein that is in fluid communication with the at least one first inlet channel and the first outlet channel when the first cavity is in a production mode. The second piston defines a first cavity therein that is in fluid communication with the at least one second inlet channel and the second outlet channel when the first cavity of the second piston is in the production mode. The first filter element is disposed in the first cavity of the first piston, and the second filter element is disposed in the first cavity of the second piston. The first backflush channel extends between the first bore and the backflush valve and the second backflush channel extends between the second bore and the backflush valve. The backflush valve comprises an inner surface that defines a valve chamber therein that is configured to fill with the fluid such that, when the filtering device is operated in a backflush mode, the backflush valve (1) compresses fluid from the valve chamber into the first cavity via the first backflush channel so as to increase a pressure of the fluid in the first cavity, and (2) opens so as to discharge the compressed fluid from the first cavity out the backflush valve.

Another example includes a method of operating a filtering device having a housing and first and second pistons disposed in first and second bores of the housing. The method comprises a step of moving the first piston so as to move a first cavity in the first piston from a production mode, in which the first cavity is in fluid communication with at least one first inlet channel and a first outlet channel of the housing, to a first isolated position in which the first cavity is not in fluid communication with the at least one first inlet channel or the first outlet channel of the housing. The method comprises a step of pressuring the first cavity with fluid by causing a fluid to flow from a first cavity in the second piston to a first filter element disposed in the first cavity of the first piston via at least one backflush channel of the housing and then isolating the first cavity in the second piston from the at least one backflush channel. The method comprises a step of opening a backflush valve of the filtering device to cause the pressurized fluid in the first cavity to flow from the first cavity, through the first backflush channel, and out the backflush valve. The method comprises a step of backflushing the first filter element by moving the first piston to a second isolated position, in which the cavity is in fluid communication with the first outlet channel but not in fluid communication with the at least one first inlet channel, such that the fluid flows from the first outlet channel through the first filter element along an upstream direction, through the first backflush channel, and out the backflush valve.

Yet another example is a filtering device configured to filter a fluid. The filtering device comprises a backflush valve, a housing, and first and second pistons. The housing defines at least one inlet opening, first and second bores, at least one first inlet channel, at least one second inlet channel, and first and second backflush channels. The at least one first inlet channel extends from the at least one inlet opening to the first bore. The at least one second inlet channel extends from the at least one inlet opening to the second bore. The first and second outlet channels are in communication with the first and second bores, respectively. The first backflush channel extends between the first bore and the backflush valve and the second backflush channel that extends between the second bore and the backflush valve. The first piston is movably disposed in the first bore and defines a first cavity therein that is in fluid communication with the at least one first inlet channel and the first outlet channel when the first cavity is in a production mode. The first piston defines a groove at an upstream side thereof that extends away from the first cavity of the first piston. Further, the first piston is movable so as to align the groove of the first piston with the first backflush channel. The second piston is movably disposed in the second bore and defines a first cavity therein that is in fluid communication with the at least one second inlet channel and the second outlet channel when the first cavity of the second piston is in the production mode. The second piston defines a groove at an upstream side thereof that extends away from the first cavity of the second piston. Further, the second piston is movable so as to align the groove of the second piston with the second backflush channel.

BRIEF DESCRIPTION OF THE DRAWINGS

The following description of the illustrative examples may be better understood when read in conjunction with the appended drawings. It is understood that potential examples of the disclosed systems and methods are not limited to those depicted.

FIG. 1 shows a front perspective view of a filtering device according to one example;

FIG. 2 shows a rear perspective view of the filtering device of FIG. 1;

FIG. 3 shows a front perspective view of a piston of the filtering device of FIG. 1 according to one example, with first and second filter elements of the piston in an exploded position;

FIG. 4 shows a rear perspective view of the piston of FIG. 3;

FIG. 7 shows a rear view of the filtering device of FIG. 1 with outlet channels of the filtering device shown in hidden lines;

FIG. 8 shows a perspective view of a manifold of the filtering device of FIG. 1 with manifold channels shown in hidden lines;

FIG. 16 shows a perspective view of the filtering device of FIG. 1 with a first filter element of the filtering device in an isolated position, wherein the first filter element is isolated from inlet and outlet channels of the filtering device but is in fluid communication with a second filter element via a backflush channel;

FIG. 17 shows an enlarged view of a portion of the view of FIG. 16;

FIG. 20 shows a perspective view of the filtering device of FIG. 1 with the first filter element in an isolated position, wherein the first filter element is isolated from inlet and outlet channels of the filtering device and isolated from the second filter element;

FIG. 21 shows an enlarged view of a portion of the view of FIG. 20;

FIG. 26 shows a front perspective view of a filtering device according to another example;

FIG. 27 shows a rear perspective view of the filtering device of FIG. 26;

FIG. 28 shows a cross-sectional side view of the filtering device of FIG. 26 according to one example taken through a pair of opposing backflush valves of the filtering device and with both backflush valves in closed positions;

FIG. 29 shows a cross-sectional side view of the filtering device of FIG. 26 according to one example taken through a pair of opposing backflush valves of the filtering device and with one a first one of the backflush valves in a closed position and a second one of the backflush valves in an open position; and FIG. 30 shows a cross-sectional side view of the filtering device of FIG. 26 according to one example taken through a pair of opposing backflush valves of the filtering device and with one a first one of the backflush valves in an open position and a second one of the backflush valves in a closed position.

DETAILED DESCRIPTION

Figure 5:
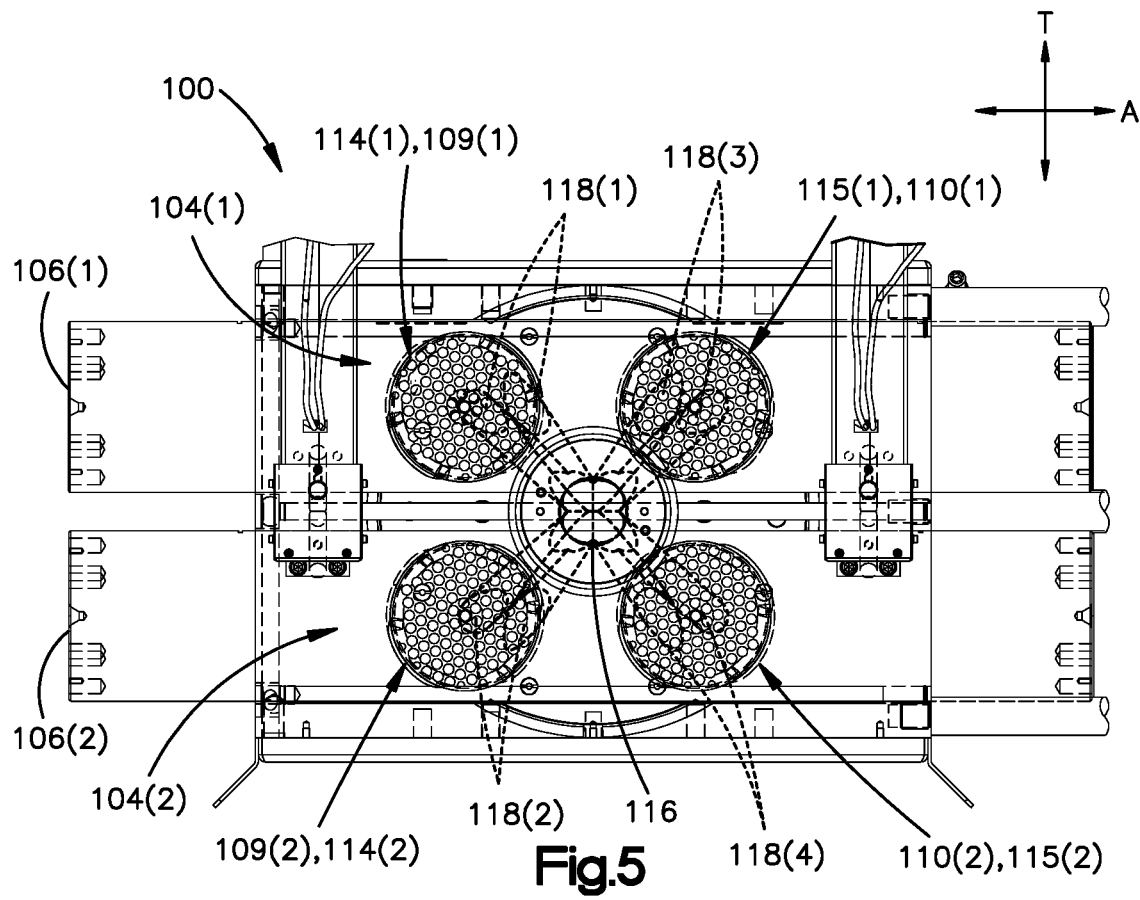
FIG. 5 shows a front view of the filtering device of FIG. 1 with the first and second pistons in a production mode and inlet channels shown in hidden lines.

Described herein are fluid filtering devices and methods of operating the same. In some examples, a first cavity of a first piston of a filtering device can be isolated from inlet and outlet channels of the filtering device, so as to remove the first cavity from a production mode. The first cavity can then be pressurized by applying fluid flow from a first backflush channel to a first filter element disposed in the first cavity. In some examples, the pressure in the first cavity can be increased above the normal operating pressure of the first cavity in the production mode. The fluid in the pressurized cavity can then be discharged to atmosphere and fluid flow through the first filter element in a reverse direction (i.e., an upstream direction) so as to clean impurities and agglomerations from the first filter element. This process can be similarly performed for one or more other cavities of the filtering device.

Referring to FIGS. 1 and 2, a filtering device 100 is shown according to one example. In general, the filtering device 100 comprises a plurality of filter elements, each of which can be selectively switched between a production mode and a backflushing mode. When a filter element is in the production mode, the filter element is configured to receive a fluid, filter the fluid so as to remove impurities and agglomerations, and communicate the filtered fluid to processing downstream of the filtering device 100 for further processing. The fluid can be a high-viscosity fluid, such as a molten thermoplastic, or any other suitable fluid. When a filter element is in the backflushing mode, the filtering device 100 is configured to reverse a flow of fluid through the filter element so as to detach impurities and agglomerations for the filter element and flush them from the filtering device 100.

The filtering device 100 comprises a housing 102 that defines a first bore 104(1) and a second bore 104(2) therethrough. The first and second bores 104(1) and 104(2) can extend through the housing along a lateral direction A. The filtering device 100 comprises a first piston 106(1) disposed in the first bore 104(1) and a second piston 106(2) disposed in the second bore 104(2). The first piston 106(1) is configured to translate within the first bore 104(1) along the lateral direction A. The filtering device 100 can comprise a first actuator 108(1) that is configured to translate the first piston 106(1) within the first bore 104(1) along the lateral direction A, although it will be understood that the first actuator 108(1) can be distributed as a separate component from the filtering device 100. Similarly, the second piston 106(2) is configured to translate within the second bore 104(2) along the lateral direction A. The filtering device 100 can comprise a second actuator 108(2) that is configured to translate the second piston 106(2) within the second bore 104(2) along the lateral direction A, although it will be understood that the second actuator 108(2) can be distributed as a separate component from the filtering device 100. Each actuator 108(1) and 108(2) can be any suitable actuator, such as a linear actuator, such as (without limitation) a hydraulic cylinder, pneumatic cylinder, or piezoelectric actuator.

The filtering device 100 can have at least one backflush valve that is configured to enable backflushing of the filtering device 100. In one example, the filtering device 100 can comprise a first backflush valve 134(1) and a second backflush valve 134(2). Each backflush valve 134(1) and 134(2) can be disposed at an upstream side 102a of the housing 102. However, it will be noted that, in alternative embodiments, one or both of the backflush valves 134(1) and 134(2) can be disposed at a downstream side 102b of the housing 102. The first backflush valve 134(2) can be offset from the second backflush valve 134(2) along the lateral direction A.

The housing 102 can have an upstream side 102a and a downstream side 102b that are offset from one another along a longitudinal direction L. The housing 102 can have first lateral side 102c and a second lateral side 102d that are offset from one another along a lateral direction A. The housing 102 can have an upper end 102e and a lower end 102f that are offset from one another along a transverse direction T. The housing can be shaped as a cuboid as shown or can have any suitable alternative shape. The first and second bores 104 and 106 can extend through the housing 102 along the lateral direction A. The first and second bores 104 and 106 can be offset from one another along the transverse direction T.

Turning to FIGS. 3 and 4, an example of the first piston 108(1) of the filtering device 100 is shown. Each of the first and second pistons 108(1) and 108(2) can be implemented as shown in FIGS. 3 and 4. The piston 108 has a first end 108a and a second end 108b that are offset from one another along the lateral direction A. The piston 108 has an outer surface 108c that extends between the first and second ends 108a and 108b. In one example, the piston 108 can have a circular cross-sectional shape along a plane that is perpendicular to the lateral direction A. Thus, the piston 108 can have a cylindrical shape, and the outer surface 108c can be a curved outer surface. However, in alternative examples, the piston 108 can have other suitable cross-sectional shapes, such as a rectangular shape.

The piston 108 can define at least one cavity therein. In some examples, the at least one piston 108 can include a first cavity 109 and a second cavity 110. Each cavity 109, 110 can extend into the outer surface 108c of the piston 108 along a select direction. In one example, the select direction can be the longitudinal direction L. Each cavity 109, 110 can extend into the piston 108 on an upstream side of the piston 108 that is configured to receive the fluid. Each cavity 109, 110 can have a circular cross-sectional shape in a plane that is perpendicular to the select direction, although it will be understood that each cavity can have another suitable cross-sectional shape.

The piston 108 can define a groove 107 that extends from each of the at least one cavity. Each groove 107 can extend into the outer surface 108c of the piston 108. Each groove 107 can be defined at an upstream side of the piston 108. However, in alternative examples, such as where one or both of the backflush valves 134(1) and 134(2) is at the downstream side 102b of the housing 102, each groove 107 can be defined at a downstream side of the piston 108. Each groove 107 can extend outwardly away from a corresponding one of the cavities 109, 110 along the lateral direction A and can be open to the corresponding one of the cavities 109, 110. Each groove 107 can be used for pressurizing the corresponding one of the cavities 109, 110 as will be discussed in further detail below. In one example, each groove 107 can have a triangular shape in a plane that extends along the lateral direction A and transverse direction T, although other shapes are contemplated within the scope of this disclosure. Each groove 107 has a cross-sectional dimension along the transverse direction T that is less than a cross-sectional dimension of a corresponding one of the cavities 109, 110 along the transverse direction T. Each groove 107 is in fluid communication with a corresponding one of the cavities 109, 110.

The piston 108 can define at least one piston outlet. In some examples, the at least one piston outlet can include a first piston outlet 111 and a second piston outlet 112. Each piston outlet 111, 112 can extend into the outer surface 108c of the piston 108 along the select direction towards a respective one of the cavities 109, 110. Each piston outlet 111, 112 can extend into the piston 108 on a downstream side of the piston 108 that is configured to dispense the fluid. Thus, each piston outlet 111, 112 can be offset from a corresponding cavity 109, 110 along a downstream direction. In one example, the downstream direction can be aligned with the longitudinal direction L. Each piston outlet 111, 112 can be in fluid communication with a corresponding cavity 109, 110.

Each piston outlet 111, 112 can be elongate along the lateral direction A. Thus, each piston outlet 111, 112 can have a width along the lateral direction A that is greater than a height of the piston outlet 111, 112 along the transverse direction T. The elongate shapes of the piston outlets 111 and 112 allows one cavity 109, 110 to remain in fluid communication with at least one inlet channel 118 and an outlet channel 120 (both discussed below) of the housing as piston 108 is moved between different positions so as to backflush the other cavity 109, 110. Each piston outlet 111, 112 can have a first end 111a, 112a and a second end 111b, 112b that are offset from one another along the lateral direction A. Each piston outlet 111, 112 can have an intermediate portion 111c, 112c, between its first end 111a, 112a and its second end 111b, 112b. The first end 111a, 112a and the second end 111b, 112b of each outlet 111, 112 can each be enlarged relative to the intermediate portion 111c, 112c. For example, the first end 111a, 112a and the second end 111b, 112b can each have a height that is greater than a height of the intermediate portion 111c, 112c. In one example, the first end 111a, 112a and the second end 111b, 112b of each outlet 111, 112, can each have a circular cross-sectional shape, and the intermediate portion 111c, 112c can have a rectangular cross-sectional shape. However, it will be understood that each piston outlet 111, 112 can have another suitable shape.

The filtering device 100 can comprise at least one filter element for each piston 108. Each cavity 109, 110 is configured to receive at least one of the filter elements. For example, the first cavity 109 can be configured to receive a first filter element 114, and the second cavity 110 can be configured to receive a second filter element 115. Each filter element can be a screen, such as a woven metal mesh with small openings that create a flow resistance, or any other suitable filter element that is suitable for filtering the particular fluid that is received by the filtering device 100.

Figure 6:
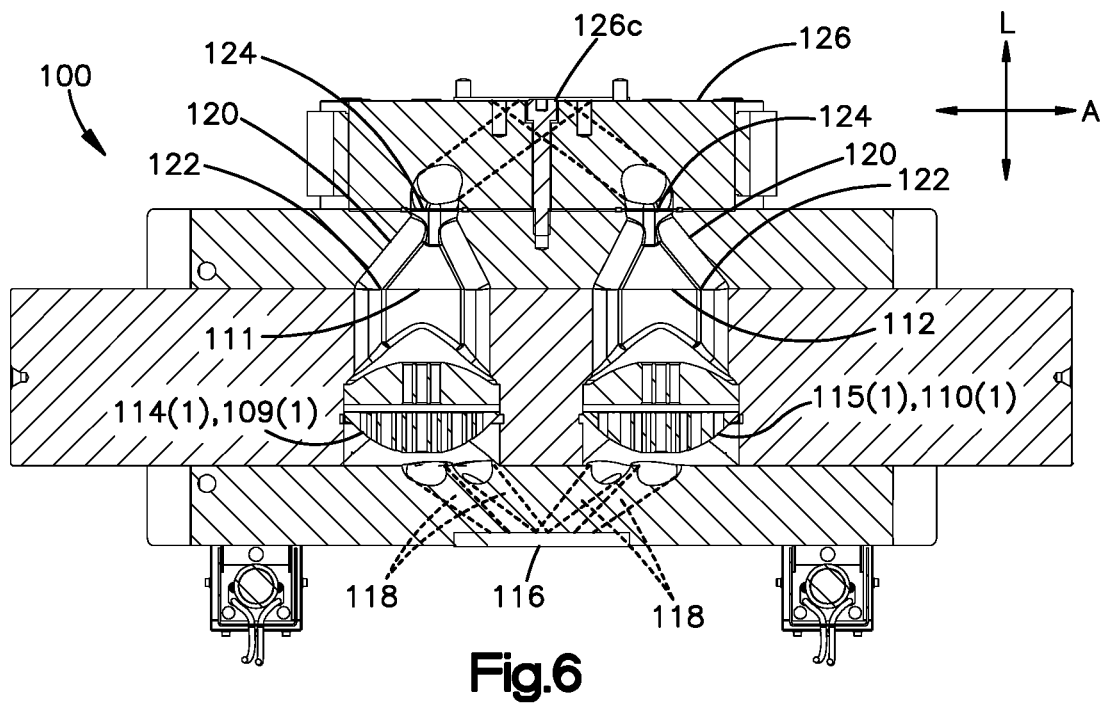
FIG. 6 shows a cross-sectional top view of the filtering device of FIG. 1 with the first and second pistons in a production mode and with inlet channels and manifold channels of the filtering device shown in hidden lines.

Turning now to FIGS. 5 and 6, front and top views of the filtering device are shown, respectively, of the filtering device 100 in the production mode. In FIGS. 5 and 6, the housing 102 is shown as transparent to illustrate a plurality of channels of the housing 102. The first piston 106(1) can include a first cavity 109(1) with at least one filter element 114(1) disposed therein. In some examples, the first piston 106(1) can include a second cavity 110(1) with at least one filter element 115(1) disposed therein. Similarly, the second piston 106(2) can include a first cavity 109(2) with at least one filter element 114(2) disposed therein. In some examples, the second piston 106(2) can include a second cavity 110(2) with at least one filter element 115(2) disposed therein. When the first and second pistons 106(1) and 106(2) are in the production mode, the first cavities 109(1) and 109(2) can be aligned with one another along the transverse direction T, and the second cavities 110(1) and 110(2) can be aligned with one another along the transverse direction T.

The housing 102 defines at least one inlet opening 116 therein. The inlet opening 116 can be defined at the upstream side 102a of the housing 102. The housing 102 defines a plurality of inlet channels 118 therein, where each inlet channel extends from the at least one inlet opening 116 to a respective one of the bores 104(1), 104(2). The housing 102 can define at least one inlet channel 118 for each cavity 109(1), 110(1), 109(2), 110(2). In some examples, the housing 102 can define two or more inlet channels 118 for each cavity 109(1), 110(1), 109(2), 110(2). Each channel 118 can extend away from the at least one inlet opening 116 along a direction that has a directional component along the lateral direction A. Additionally, or alternatively, each channel 118 can extend away from the at least one inlet opening 116 along a direction that has a directional component along the transverse direction T.

The housing 102 can define at least one inlet channel 118(1) for the first cavity 109(1) of the first piston 106(1) and at least one inlet channel 118(2) for the first cavity 109(2) of the second piston 106(2). The at least one inlet channel 118(1) for the first cavity 109(1) of the first piston 106(1) is in fluid communication with the first bore 104(1), and the at least one inlet channel 118(2) for the first cavity 109(2) of the second piston 106(2) is in fluid communication with the second bore 104(2). The at least one inlet channel 118(1) for the first cavity 109(1) of the first piston 106(1) is in fluid communication with the first cavity 109(1) when the first piston 106(1) is in the production mode. The at least one inlet channel 118(2) for the first cavity 109(2) of the second piston 106(2) is in fluid communication with the first cavity 109(2) when the second piston 106(2) is in the production mode.

Similarly, in examples in which the first and second pistons 106(1) and 106(2) each have first and second cavities, the housing 102 can define at least one inlet channel 118(3) for the second cavity 110(1) of the first piston 106(1) and at least one inlet channel 118(4) for the second cavity 110(2) of the second piston 106(2). The at least one inlet channel 118(3) for the second cavity 110(1) of the first piston 106(1) is in fluid communication with the first bore 104(1), and the at least one inlet channel 118(4) for the second cavity 110(2) of the second piston 106(2) is in fluid communication with the second bore 104(2). The at least one inlet channel 118(3) for the second cavity 110(1) of the first piston 106(1) is in fluid communication with the second cavity 110(1) when the first piston 106(1) is in the production mode. The at least one inlet channel 118(4) for the second cavity 110(2) of the second piston 106(2) is in fluid communication with the second cavity 110(2) when the second piston 106(2) is in the production mode.

With reference to FIGS. 6 and 7, the housing 102 defines a plurality of outlet channels 120 (e.g., 120(1), 120(2), 120(3), 120(4)) therein, where each outlet channel 120 extends from a respective one of the bores 104(1) and 104(2). Each outlet channel 120 is positioned downstream from the inlet opening 116 with respect to the direction of fluid flow through the filtering device 100. The housing 102 can define at least one outlet channel 120 for each cavity 109(1), 110(1), 109(2), 110(2). When in the production mode, each outlet channel 120 can extends away from a respective one of the cavities 109(1), 110(1), 109(2), 110(2) along the downstream direction. In the production mode, fluid flows from the inlet channels 118(1), 118(2), 118(3), 118(4), through the filter elements 114(1), 114(2), 115(1), 115(2), and to the outlet channels 120(1), 120(2), 120(3), 120(4). The filter elements restrict the fluid flow through the cavities 109(1), 110(1), 109(2), 110(2), and as a result, a pressure at the inlet channels can be higher than a pressure at the outlet channels. In other words, in the production mode, the fluid in the inlet channels 118(1), 118(2), 118(3), 118(4) can be at a first pressure, and the fluid in the outlet channels 120(1), 120(2), 120(3), 120(4) can be at a second pressure, less than the first pressure. Thus, each filter element 114(1), 114(2), 115(1), 115(2) can have a higher pressure side upstream of the filter element, and a lower pressure side downstream of the filter element.

Each outlet channel 120 can define an inner opening 122 at a corresponding one of the bores 104(1), 104(2). In some examples, the size and shape of each inner opening 122 can match a size and shape of a corresponding one of the piston outlets 111, 112. For example, each inner opening 122 (e.g., 122(1), 122(2), 122(3), 122(4)) can be elongate along the lateral direction A. Thus, each inner opening 122 can have a width along the lateral direction A that is greater than a height of the inner opening 122 along the transverse direction T. Each inner opening 122 can have a first end 122a and a second end 22b that are offset from one another along the lateral direction A. Each inner opening 122 can have an intermediate portion 122c, between its first end 122a and its second end 122b. The first end 122a and the second end 122b of each inner opening 122 can each be enlarged relative to the intermediate portion 122c. For example, the first end 122a and the second end 122b can each have a height that is greater than a height of the intermediate portion 122c. In one example, the first end 122a and the second end 122b of each inner opening 122 can each have a circular cross-sectional shape, and the intermediate portion 122c can have a rectangular cross-sectional shape. However, it will be understood that each inner opening 122 can have another suitable shape.

Each outlet channel 120 can define an outer opening 124 (e.g., 124(1), 124(2), 124(3), 124(4)). Each outer opening 124 can be defined downstream of the inner opening 122 of the channel 120. For example, each outer opening 124 can be defined at the downstream side 102b of the housing 102. Each outer opening 124 can have a circular shape as shown, or any other suitable shape. Each channel 120 can taper inwardly from its inner opening 122 to its outer opening 124 as the channel 120 extends along the downstream direction.

As shown in FIGS. 5-7, with particular focus on FIG. 7, the housing 102 can define an outlet channel 120(1) for the first cavity 109(1) of the first piston 106(1), the outlet channel 120(1) having an inner opening 122(1) and an outer opening 124(1). The housing 102 can define an outlet channel 120(2) for the first cavity 109(2) of the second piston 106(2), the outlet channel 120(2) having an inner opening 122(2) and an outer opening 124(2). The outlet channel 120(1) for the first cavity 109(1) of the first piston 106(1) is in fluid communication with the first bore 104(1), and the outlet channel 120(2) for the first cavity 109(2) of the second piston 106(2) is in fluid communication with the second bore 104(2). The outlet channel 120(1) for the first cavity 109(1) of the first piston 106(1) is in fluid communication with the first piston outlet 111 of the first piston 106(1) when the first piston 106(1) is in the production mode. The outlet channel 120(2) for the first cavity 109(1) of the second piston 106(2) is in fluid communication with the first piston outlet 111 of the second piston 106(2) when the second piston 106(2) is in the production mode.

Referring now to FIGS. 2 and 8, the filtering device 100 can include a manifold 126 disposed at the downstream side 102b of the housing 102. The manifold 126 can be configured to receive fluid streams from the plurality of outlet channels 120(1), 120(2), 120(3), and 120(4), combine the fluid streams to an outlet 126c of the filtering device 100. The manifold 126 can have an upstream side 126a and a downstream side 126b. The outlet 126c can be disposed at the downstream side 126b. The manifold 126 can have a plurality of manifold channels 128(1), 128(2), 128(3), 128(4). Each manifold channel 128(1), 128(2), 128(3), 128(4) can define a manifold inlet opening 130(1), 130(2), 130(3), 130(4) at the upstream side 126a. Thus, each manifold channel 128(1), 128(2), 128(3), 128(4) can extend from the outlet 126c to a corresponding one of the manifold inlet openings 130(1), 130(2), 130(3), 130(4). Each manifold channel 128(1), 128(2), 128(3), 128(4) can extend away from the outlet 126c along a direction that has a directional component along the lateral direction A. Additionally, or alternatively, each manifold channel 128(1), 128(2), 128(3), 128(4) can extend away from the outlet 126c along a direction that has a directional component along the transverse direction T. It will be understood that, in alternative examples, the manifold 126 can be omitted from the filtering device 100. For example, the channels 128(1), 128(2), 128(3), 128(4) and outlet 126c can be defined by the housing 102.

Turning to FIGS. 9, 10, 12, and 13, the housing 102 can define at least one backflush channel, such as a plurality of backflush channels 132(1), 132(2), 132(3), 132(4), therein. Each backflush channel extends from the upstream side 102a of the housing 102 to a respective one of the bores 104(1), 104(2). The housing 102 can define a backflush channel for each cavity 109(1), 110(1), 109(2), 110(2). Each backflush channel 132(1), 132(2), 132(3), 132(4) can be outwardly offset from the at least one inlet 116 along the lateral direction A. Each backflush channel can be spaced entirely from the at least one inlet 116 and from the inlet channels 118(1), 118(2), 118(3), 118(4).

The housing 102 can define a first backflush channel 132(1) and a second backflush channel 132(2). The first and second backflush channels 132(1) and 132(2) can be offset from one another along the transverse direction T. The first backflush channel 132(1) extends between an inlet of the first backflush valve 134(1) and the first bore 104(1). Thus, the first backflush channel 132(1) is in fluid communication with the first backflush valve 134(1) and the first bore 104(1). The first backflush channel 132(1) is configured to be in fluid communication with the first cavity 109(1) of the first piston 106(1) when the first piston 106(1) is in the backflushing mode. The second backflush channel 132(2) extends between the inlet of the first backflush valve 134(1) and the second bore 104(2). Thus, the second backflush channel 132(2) is in fluid communication with the first backflush valve 134(1) and the second bore 104(2). The second backflush channel 132(2) is configured to be in fluid communication with the first cavity 109(2) of the second piston 106(2) when the second piston 106(2) is in the backflushing mode. The second backflush channel 132(2) can also be in fluid communication with the first backflush channel 132(1).

Similarly, in examples in which the first and second pistons 106(1) and 106(2) each have first and second cavities, the housing 102 can define a third backflush channel 132(3) and a fourth backflush channel 132(4). The third and fourth backflush channels 132(3) and 132(4) can be offset from one another along the transverse direction T. The third backflush channel 132(3) extends between an inlet of the second backflush valve 134(2) and the first bore 104(1). Thus, the third backflush channel 132(3) is in fluid communication with the second backflush valve 134(2) and the first bore 104(1). The third backflush channel 132(3) is configured to be in fluid communication with the second cavity 110(1) of the first piston 106(1) when the first piston 106(1) is in the backflushing mode. The fourth backflush channel 132(4) extends between an inlet of the second backflush valve 134(2) and the second bore 104(2). Thus, the fourth backflush channel 132(4) is configured to be in fluid communication with the second backflush valve 134(2) and the second bore 104(2). The fourth backflush channel 132(4) is configured to be in fluid communication with the second cavity 110(2) of the second piston 106(2) when the second piston 106(2) is in the backflushing mode.

Figure 10:
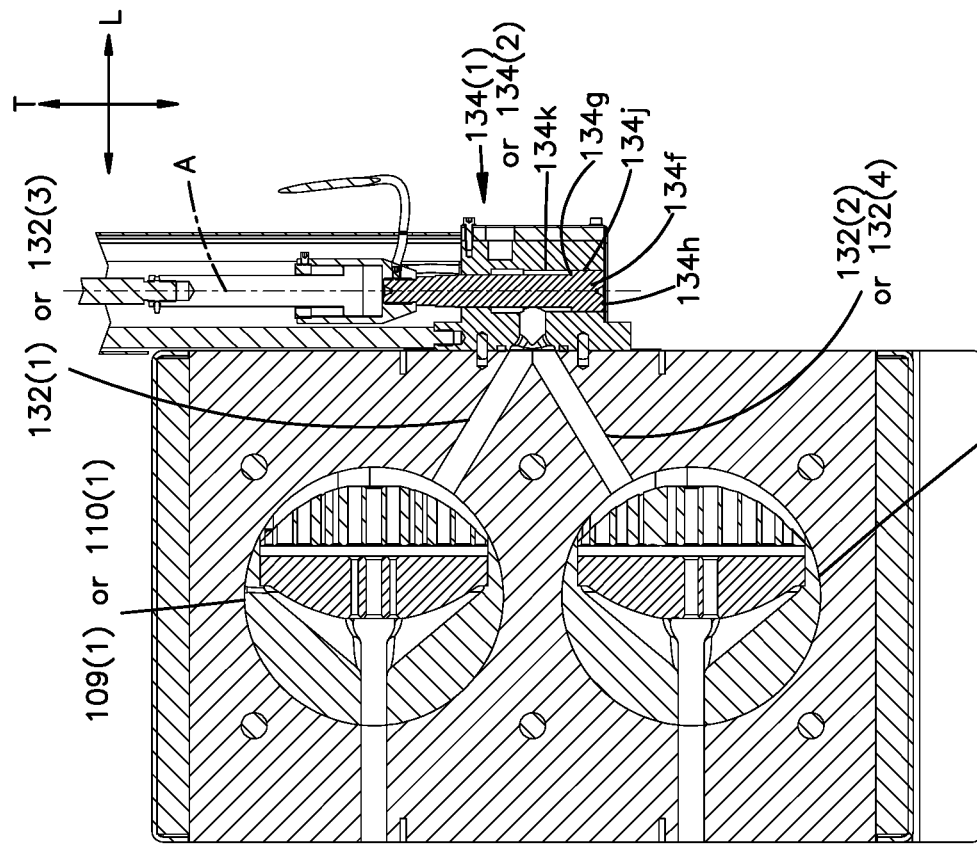
FIG. 10 shows a cross-sectional side view of the filtering device of FIG. 1 according to one example taken through one of first and second backflush valves of the filtering device and with the backflush valve in a closed position.
Figure 9:
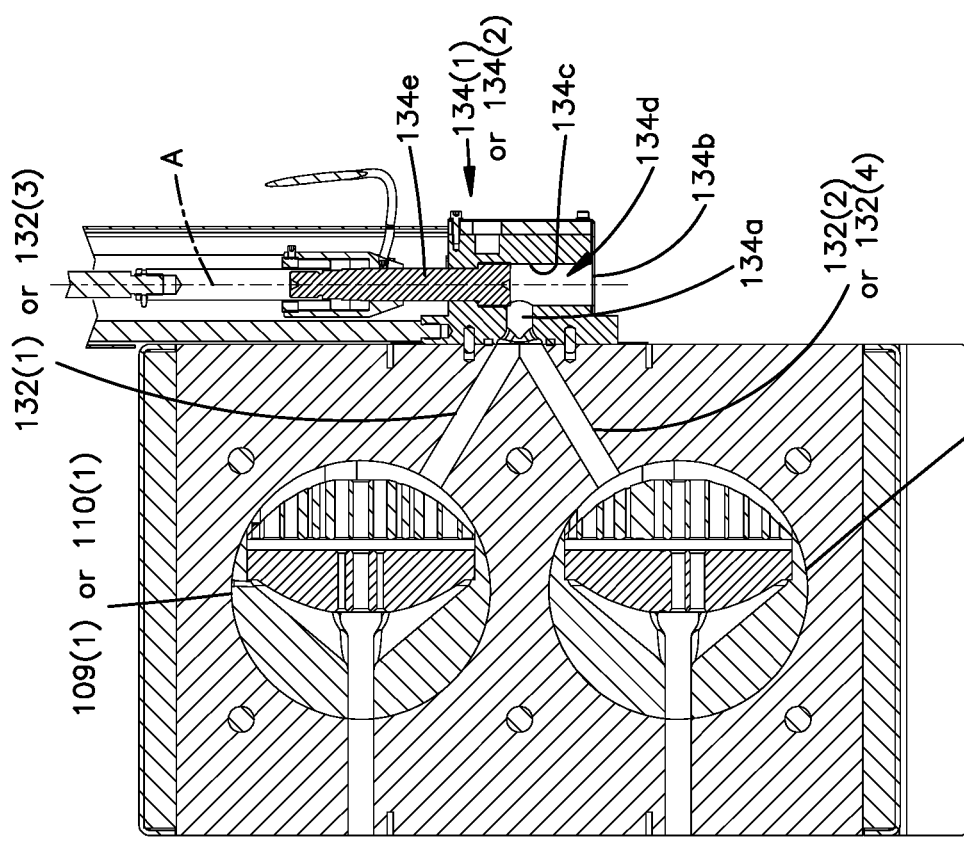
FIG. 9 shows a cross-sectional side view of the filtering device of FIG. 1 according to one example taken through one of first and second backflush valves of the filtering device and with the backflush valve in an open position.

Referring more specifically to FIGS. 9 and 10, the first backflush valve 134(1) can be configured to selectively moved between an open position (FIG. 9) and a closed position (FIG. 10). In the open position, the first backflush valve 134(1) places the first and second backflush channels 132(1) and 132(2) in fluid communication with the atmosphere outside of the filtering device 100. In the closed position, the first backflush valve 134(1) closes such that the first and second backflush channels 132(1) and 132(2) are not in fluid communication with the atmosphere outside of the filtering device 100. The first backflush valve 134(1) can be a pressure-boosting shutoff valve that is configured to increase a pressure within the first and second backflush channels 132(1) and 132(2) during a backflush operation as will be described in further detail below. Alternatively, the first backflush valve 134(1) can be a standard shutoff valve, such as (without limitation) the shutoff valve 134(1) shown in FIGS. 28 to 30 or any other suitable shutoff valve, that can be opened or closed without increasing pressure within the first and second backflush channels 132(1) and 132(2).

Similarly, the second backflush valve 134(2) can be configured to selectively moved between an open position (FIG. 9) and a closed position (FIG. 10). Note that the cross-sections at the first and second backflush valves 134(1) and 134(2) may be identical, and thus FIGS. 9 and 10 can depict either of the first and second backflush valves 134(1) and 134(2). In the open position, the second backflush valve 134(2) places the third and fourth backflush channels 132(3) and 132(4) in fluid communication with the atmosphere outside of the filtering device 100. In the closed position, the second backflush valve 134(2) closes such that the third and fourth backflush channels 132(3) and 132(4) are not in fluid communication with the atmosphere outside of the filtering device 100. The second backflush valve 134(2) can be a pressure-boosting valve that is configured to increase a pressure within the third and fourth backflush channels 132(3) and 132(4) during a backflush operation as will be described in further detail below. Alternatively, the second backflush valve 134(2) can be a standard shutoff valve, such as (without limitation) the shutoff valve 134(1) shown in FIGS. 28 to 30 or any other suitable shutoff valve, that can be opened or closed without increasing pressure within the third and fourth backflush channels 132(3) and 132(4).

As discussed above, in one example, the first backflush valve 134(1) and/or the second backflush valve 134(2) can be implemented as a pressure-boosting backflush valve. FIGS. 9 and 10 show one example of a pressure-boosting backflush valve; however, it will be understood that the pressure-booting backflush valves can be configured in another suitable manner. The pressure-boosting backflush valve has a valve inlet 134a and a valve outlet 134b. The valve inlet 134a can be in fluid communication with at least one backflush channel, such as backflush channels 132(1) and 132(2). The pressure-boosting backflush valve 134 can have an inner surface 134c that defines a valve chamber 134d therein. The valve chamber 134d can have a first end and a second end that are offset from one another along a valve axis A. In one example, the valve axis A can extend along the transverse direction T. The valve inlet 134a can extend through the inner surface 134c such that the valve inlet 134a is open to the valve chamber 134d at a position that is between the first and second ends of the valve chamber 134d. The valve outlet 124b can be defined at the second end of the valve chamber 134d. The valve outlet 124b can be positioned such that the valve axis A extends through the valve outlet 124b.

The pressure-boosting backflush valve can have a valve stem 134e that is configured to translate within the valve chamber 134d. The valve stem 134e can be configured to translate along the valve axis A. The valve can comprise a valve seat 134f that is fixedly attached to the valve stem 134e such that the valve seat 134f translates with the valve stem 134e. The valve is configured to translate the valve seat 134f along the valve axis A on opposing sides of the valve inlet 134a. The valve seat 134f has an inner surface 134g, an outer surface 134h opposite the inner surface 134g, and a sealing surface 134j that extends between the valve seat inner surface 134g and the valve seat outer surface 134h. The sealing surface 134j is configured to seal against the inner surface 134c of the valve chamber 134.

The valve stem 134e can have a cross-sectional dimension in a plane that is perpendicular to the valve axis A that is less than a cross-sectional dimension of the valve chamber 134d in the same plane. Thus, when the valve is in the closed position, a space can be defined between the inner surface 134c of the valve chamber 134d and the valve stem 134e. In one example, the space can have an annular cross-sectional shape in a plane that is perpendicular to the valve axis A. The space can be sized so as to receive fluid therein. The sealing surface 134j of the valve chamber 134 can have a cross-sectional dimension in a plane that is perpendicular to the valve axis A that is greater than a cross-sectional dimension of the valve stem 134e in the same plane and substantially equal to a cross-sectional dimension of the valve chamber 134d in the same plane. As will be described further below, during a backflushing operation, the space can be filled with the fluid, and the fluid can be forced into the backflush channels by opening the valve so as to increase a pressure within the backflush channels.

Figure 11:
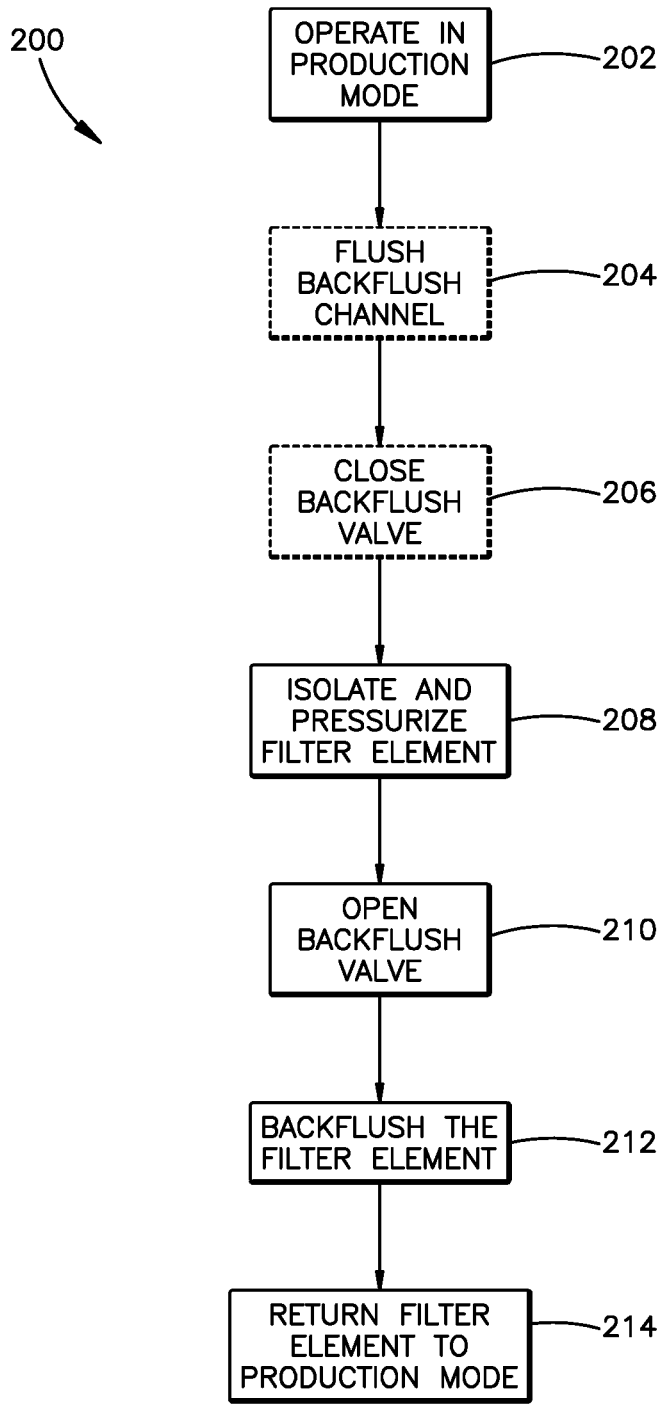
FIG. 11 shows a simplified flow diagram of a method of operating the filtering device of FIG. 1 according to one example.
Figure 12:
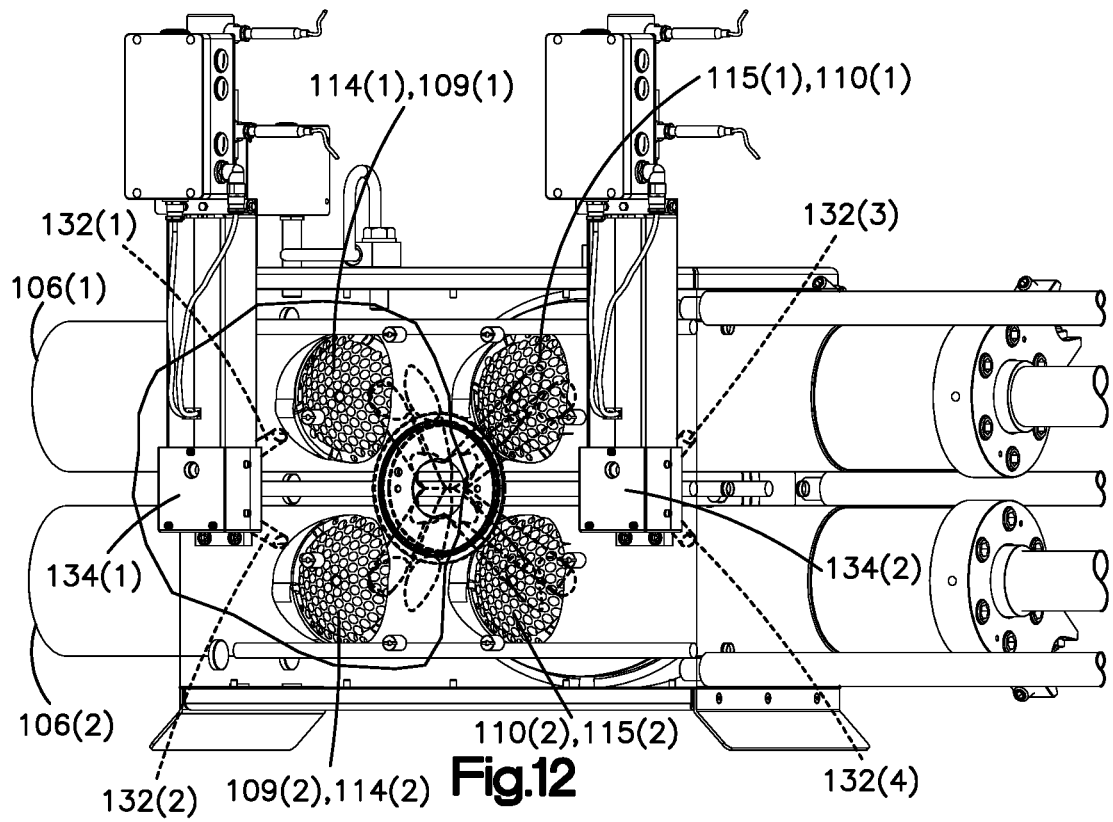
FIG. 12 shows a perspective view of the filtering device of FIG. 1 with the first and second pistons in fluid communication with one another via backflush channels and with the backflush channels and inlet channels of the filtering device shown in hidden lines.
Figure 13:
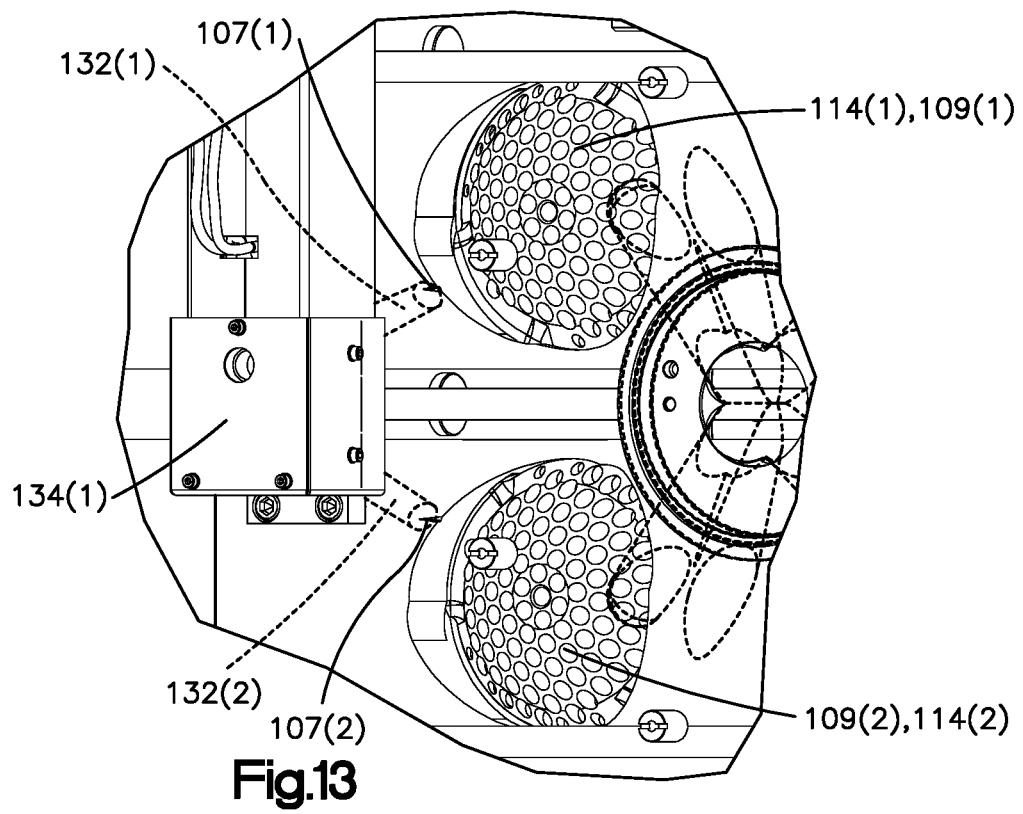
FIG. 13 shows an enlarged view of a portion of the view in FIG. 12.
Figure 14:
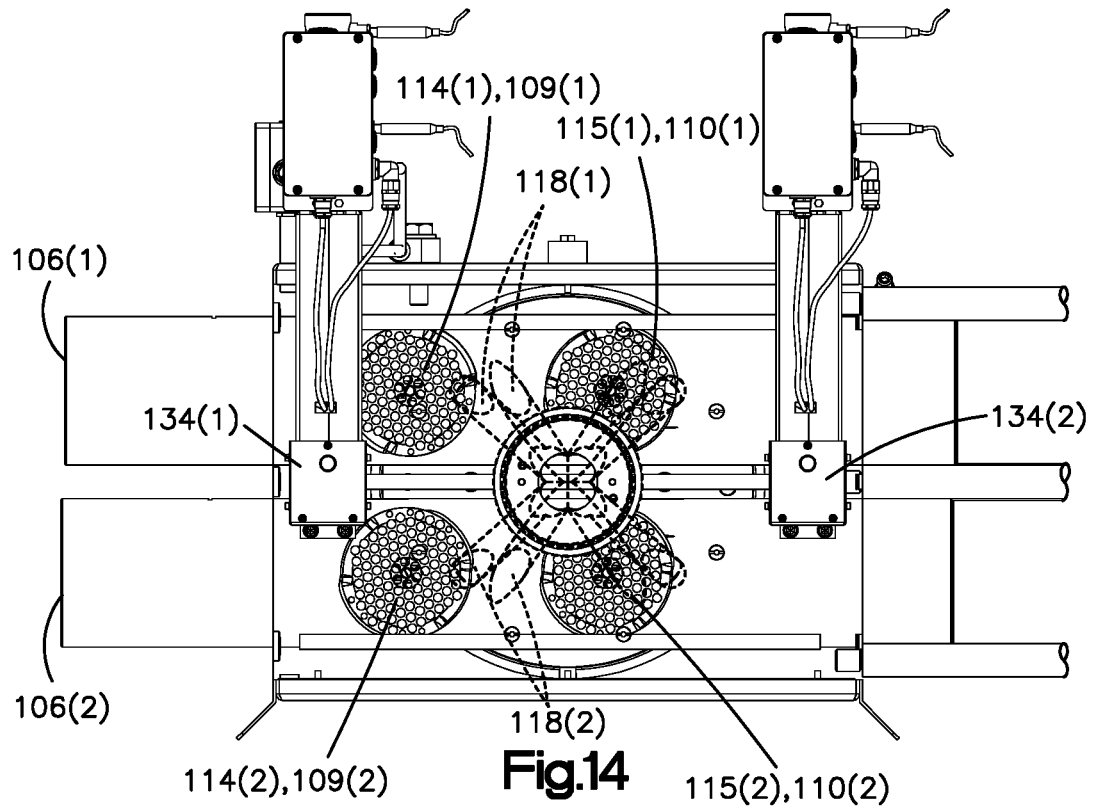
FIG. 14 shows a front view of the filtering device of FIG. 1 with the first and second pistons positioned as shown in FIG. 12.

Turning now to FIG. 11, a method 200 of operating the filtering device 100 will now be discussed. With further reference to FIGS. 5 to 7, the method 200 comprises a step 202 of operating the filtering device 100 with the first and second filter elements 114(1) and 114(2), and the third and fourth filter elements 115(1) and 115(2) (if included) in the production mode and with each backflush valve 134(1), 134(2) in the closed position. For example, the first piston 106(1) can be positioned within the first bore 104(1) such that the first filter element 114(1) of the first piston 106(1) is in fluid communication with the at least one inlet channel 118(1) and, if included, the second filter element 115(1) of the first piston 106(1) is in fluid communication with the at least one fluid channel 118(3). Further, the first piston outlet 111(1) of the first piston 106(1) is aligned with the first outlet channel 120(1) of the first piston 106(1), and if included, the second piston outlet 112(1) of the first piston 106(1) is aligned with the third outlet channel 120(3).

Similarly, the second piston 106(2) can be positioned within the second bore 104(2) such that the first filter element 114(2) of the second piston 106(2) is in fluid communication with the at least one inlet channel 118(2) and, if included, the second filter element 114(4) of the second piston 106(2) is in fluid communication with the at least one fluid channel 118(4). Further, the first piston outlet 111(2) of the second piston 106(2) is aligned with the second outlet channel 120(2), and if included, the second piston outlet 112(2) of the second piston 106(2) is aligned with the fourth outlet channel 120(4).

With the filter elements 114(1), 114(2), 115(1), 115(2) in the production mode, step 202 can comprise receiving the fluid to be filtered at the inlet opening 116. Each filter element 114(1), 114(2), 115(1), 115(2) receives the fluid from the inlet opening 116 through a corresponding at least one inlet channel 118(1), 118(2), 118(3), 118(4). The fluid flows along a downstream direction through each filter element 114(1), 114(2), 115(1), 115(2) to a corresponding piston outlet 111(1), 111(2), 112(1), 112(2), and from each piston outlet to a corresponding outlet channel 120(1), 120(2), 120(3), 120(4). As the fluid flows through each filter element 114(1), 114(2), 115(1), 115(2), the filter element can restrict the fluid flow therethrough such that a pressure on an upstream side of the filter element is higher than a pressure on a downstream side of the filter element.

Referring now to FIGS. 11 to 15, after operating one or more of the filter elements in the production mode, the method 200 can comprise steps 204 to 212 to backflush a select cavity 109(1), 109(2), 110(1), 110(2), and consequently a select filter element 114(1), 114(2), 115(1), 115(2), of the filtering device 100. For ease of description, the method will be described wherein the select cavity is the first cavity 109(1) and the select filter element is the first filter element 114(1) of the first piston 106(1). However, it will be understood that steps 204 to 212 can be similarly performed to backflush any of the four filter elements 114(1), 114(2), 115(1), 115(2).

The method 200 can optionally comprise step 204 to clean at least one backflush channel, such as the first backflush channel 132(1) corresponding to the first cavity 109(1) and first filter element 114(1) of the first piston 106(1) by flushing the first backflush channel 132(1) out the outlet 134b of the first backflush valve 134(1) to discharge any degraded material disposed in the first backflush channel 132(1) to the atmosphere outside of the filtering device 100. Step 204 can additionally clean the second backflush channel 132(2) corresponding to the first cavity 109(2) and first filter element 114(2) of the second piston 106(2). The degraded material may be amounts of the fluid that stagnates under temperature. For example, if the fluid is a plastic melt, then the fluid can become discolored (e.g., brown) and carbonize over time as it stagnates in the select backflush channel 132(1). Therefore, it may be beneficial to clean the first backflush channel 132(1) to evacuate any degraded fluid therein.

Figure 15:
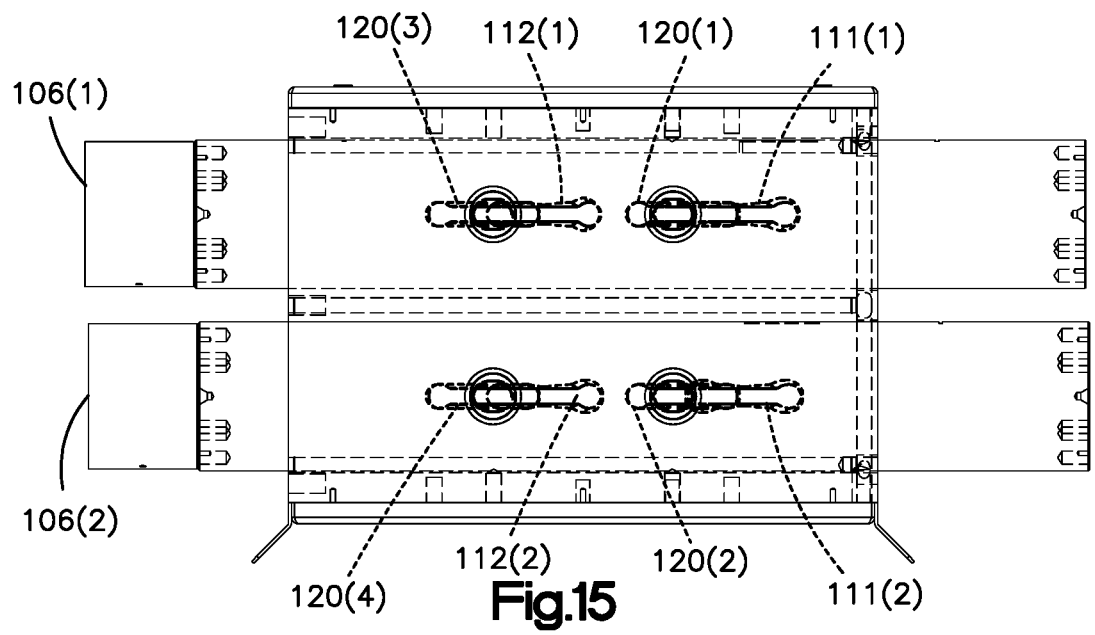
FIG. 15 shows a rear view of the filtering device of FIG. 1 with the first and second pistons positioned as shown in FIG. 12.

Step 204 can comprise a step of moving the first piston 106(1) within the first bore 104(1) until the first backflush channel 132(1) is in fluid communication with a groove 107(1) of the first cavity 109(1). In this position, the first piston 106(1) is still in a production mode, and fluid can continue to flow through the select filter element 114(1) to the first outlet channel 120(1), and through the second filter 115(1) (if implemented) to the third outlet channel 120(3). As shown in FIG. 15, the first and second piston outlets 111(1) and 112(1) of the first piston 106(1) still have some overlap with, and thus are in fluid communication with, the outlet channels 120(1) and 120(3) of the housing 102. Further, step 204 can comprise a step moving the second piston 106(2) within the second bore 104(2) until the second backflush channel 132(2) is in fluid communication with a groove 107(2) of the first cavity 109(2) of the second piston 106(2). In this position, the second piston 106(2) is still in a production mode, and fluid can continue to flow through the first filter 114(2) of the second piston 106(2) to the second outlet channel 120(2), and through the second filter 115(2) (if implemented) to the fourth outlet channel 120(4). As shown in FIG. 15, the first and second piston outlets 111(2) and 112(2) of the second piston 106(2) still have some overlap with, and thus are still in fluid communication with, the outlet channels 120(2) and 120(4) of the housing 102. Step 204 can comprise a step of moving the first backflush valve 134(1) to the open position (e.g., as shown in FIG. 9) such that fluid received by the first cavities 109(1) and 109(2) of the first and second pistons 106(1) and 106(2) is dispensed through the first and second backflush channels 132(1) and 132(2), respectively, and out of the first backflush valve 134(1) to the atmosphere.

The method 200 can optionally comprise a step 206 of moving the first backflush valve 134(1) to the closed position (e.g., as shown in FIG. 10) after a predetermined period of time. In examples in which the first backflush valve 134(1) is a pressure-boosting backflush valve, step 206 can comprise filling the chamber 134k of the backflush valve 134(1) with the fluid. In particular, the chamber 134k can be filled with the fluid as the valve seat 134f moves past the valve inlet 134a along a direction that extends from the first end of the valve chamber to the second end of the valve chamber 134d. In step 206, the pistons 106(1) and 106(2) do not move relative to their positions in step 204, and the filter elements 114(1), 114(2), 115(1), and 115(2) can remain in production mode.

Figure 18:
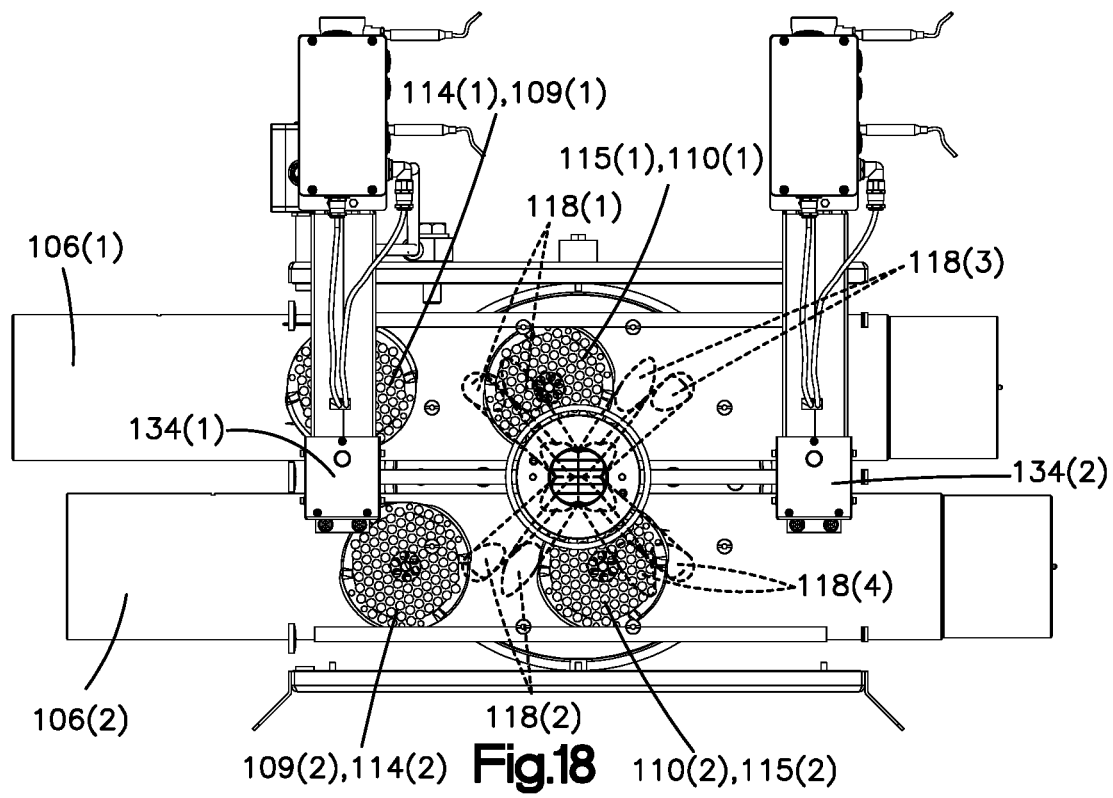
FIG. 18 shows a front view of the filtering device of FIG. 1 with the first and second pistons positioned as shown in FIG. 16.
Figure 19:
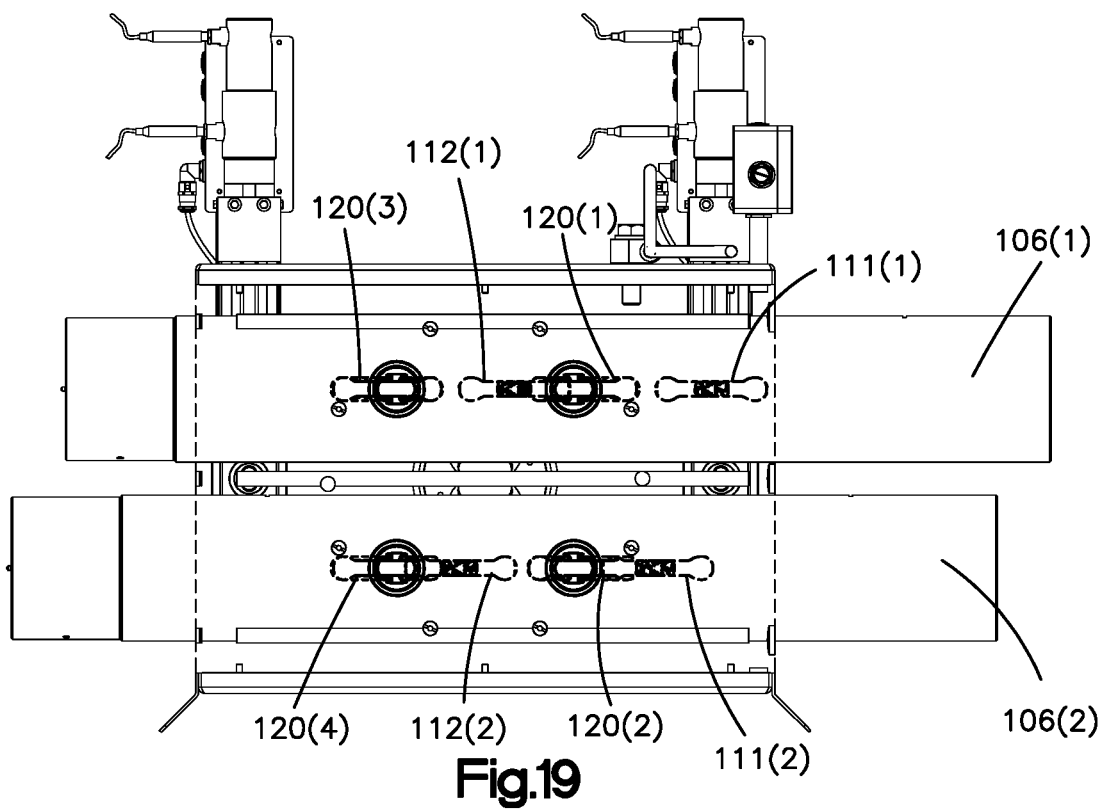
FIG. 19 shows a rear view of the filtering device of FIG. 1 with the first and second pistons positioned as shown in FIG. 16.

Turning now to FIGS. 11 and 16 to 19, the method can comprise a step 208 of isolating and pressurizing the first cavity 109(1) and first filter element 114(1). In particular, step 208 can comprise a step of moving the first piston 106(1) to a first isolated position, in which the first cavity 109(1) and first filter element 114(1) are isolated from the at least one first inlet channel 118(1) and the first outlet channel 120(1) so that fluid cannot flow through the first filter element 114(1) and out of the housing 102. Thus, as shown in FIG. 18, the first cavity 109(1) and first filter element 114(1) are not in fluid communication with any of the inlet channels 118(1), 118(2), 118(3), 118(4). Further, as shown in FIG. 19, the first piston outlet 111(1) corresponding to the first cavity 109(1) and first filter element 114(1) does not overlap with, and thus is not in fluid communication with, any of the outlet channels 120(1), 120(2), 120(3), 120(4). The second cavity 110(1) (if implemented) of the first piston 106(1) can remain in production mode. Thus, as shown in FIGS. 18 and 19, the second cavity 110(1) can have some overlap with, and thus in fluid communication with, the at least first one channel 118(1), and the second piston outlet 112(1) of the first piston 106(1) can have some overlap with, and thus in fluid communication with, the first outlet channel 120(1) of the housing 102. The first backflush valve 134(1) can remain in the closed position, and the second piston 106(2) does not move relative to its position at the end of step 206. Thus, the cavity 109(2), the cavity 110(1) (if implemented), and the cavity 110(2) (if implemented) can remain in the production mode.

In the first isolated position, the first cavity 109(1) and first filter element 114(1) can be in fluid communication with the first cavity 109(2) of the second piston 106(2). With the first cavity 109(1) and first filter element 114(1) in the first isolated position, step 208 can comprise pressurizing the first cavity 109(1) of the first piston 106(1) by flowing fluid to the first filter element 114(1). In particular, step 208 can comprise flowing the fluid from the first cavity 109(2) of the second piston 106(2), such as from the groove 107(2) of the first cavity 109(2), and through the second and first backflush channels 132(2) and 132(1) to the upstream side of the first filter element 114(1). As the fluid flows into the first cavity 109(1), the first cavity 109(1) pressurizes such that a pressure on both the upstream side and downstream side of the first filter element 114(1) is substantially equal. In the example shown, the fluid is flowed to the upstream side of the first filter element 114(1). However, it will be understood that the first backflush valve 134(1) and the backflush channels 132(1) and 132(2) can be configured to flow fluid to the downstream side of the first filter element 114(1).

With reference to FIGS. 20 to 23, once the first cavity 109(1) has been pressurized to a desired pressure or for a desired time, step 208 can comprise a step of isolating the first cavity 109(1) of the first piston 106(1) from the first cavity 109(2) of the second piston 106(2). In particular, step 208 can comprise a step of moving the second piston 106(2) such that first cavity 109(2) of the second piston 106(2) is no longer in fluid communication with the second backflush channel 132(2).

Figure 22:
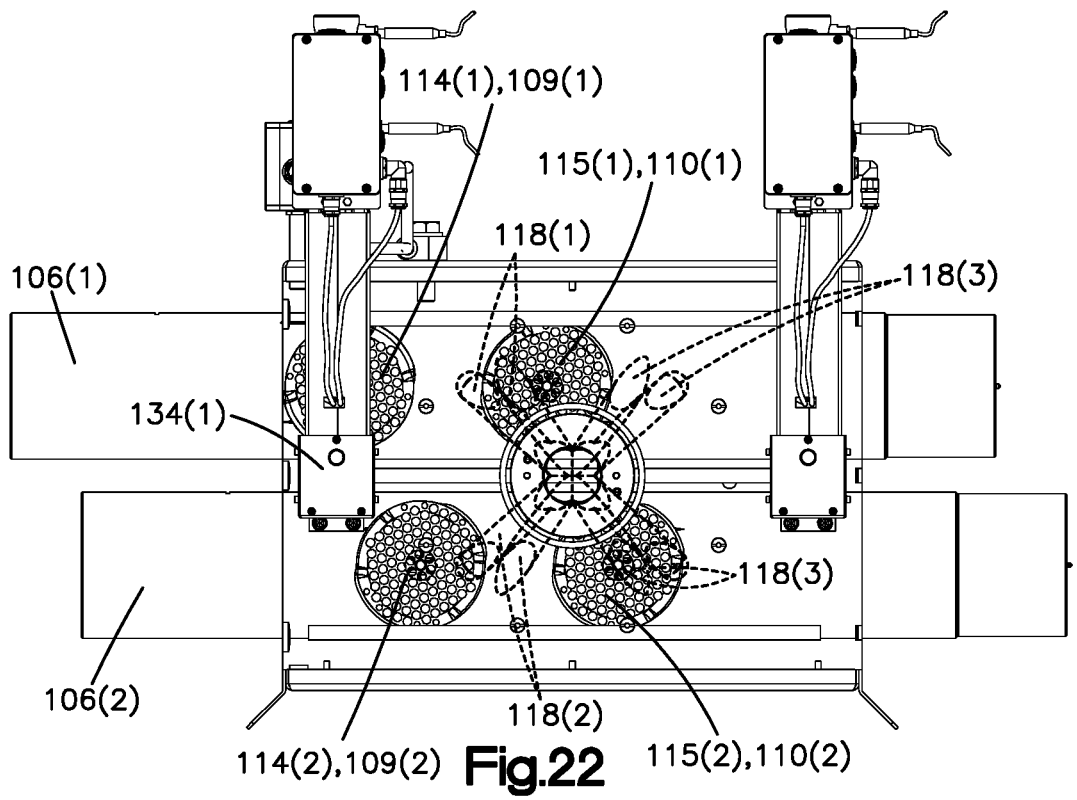
FIG. 22 shows a front view of the filtering device of FIG. 1 with the first and second pistons positioned as shown in FIG. 20.
Figure 23:
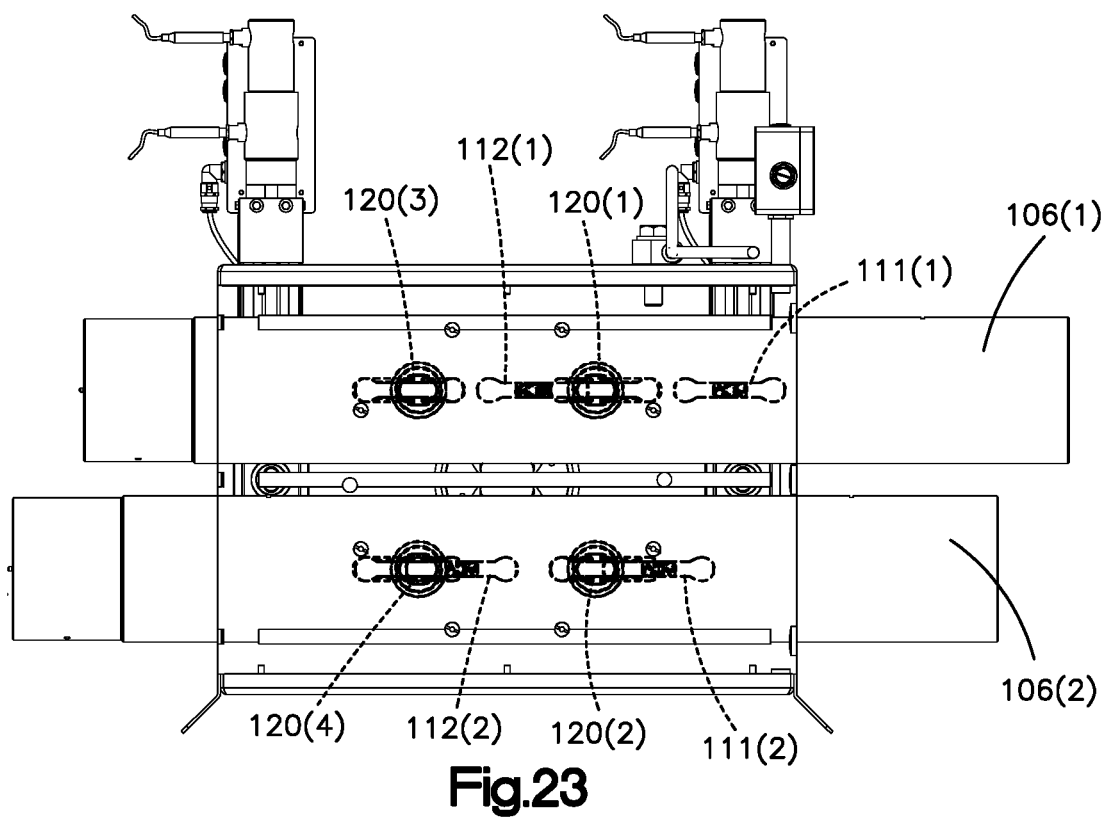
FIG. 23 shows a rear view of the filtering device of FIG. 1 with the first and second pistons positioned as shown in FIG. 20.

As shown in FIGS. 22 and 23, the first cavity 109(2) of the second piston 106(2) can have some overlap with, and thus in fluid communication with, the second at least one channel 118(2), and the first piston outlet 111(2) of the second piston 106(2) can have some overlap with, and thus in fluid communication with, the second outlet channel 120(2) of the housing 102. The first backflush valve 134(1) can remain in the closed position, and the first piston 106(1) does not move relative to its isolated position. Thus, the filter element 114(2), the filter element 115(2) (if implemented), and the filter element 115(1) (if implemented) can remain in the production mode.

Referring to FIGS. 9, 10, and 11, once the first cavity 109(1) has been pressurized to a desired pressure or for a desired time, the method can comprise a step 210 of moving the first backflush valve 134(1) to the open position as shown in FIG. 9 so as to discharge fluid in the first cavity 109(1) to the atmosphere, thereby relieving the pressure in the first cavity 109(1). Thus, step 210 can comprise causing fluid to flow from the first cavity 109(1), through the first backflush channel 132(1), and out the valve outlet 134(b).

In examples in which the backflush valve 134(1) is a pressure-boosting backflush valve, the step 210 of opening the first backflush valve 134(1) can comprise a step of increasing a pressure in the first backflush channel 132(1), and consequently in the first cavity 109(1), to a third pressure as the first backflush valve 134 is opened. The third pressure can be higher than the first pressure (i.e., the upstream pressure at the first filter element 114(1) when the first filter element 114(1) is in production mode). Sealing between the piston 106(1) and the housing 102 should be sufficient to maintain the pressure in the first cavity 109(1) at the third pressure. In particular, the step of increasing the pressure can comprise moving the valve seat 134f along a select direction towards the first end of the chamber 134k, and hence towards the valve inlet 134a, such that the fluid in the valve chamber 134d is compressed through the valve inlet 134a to the first backflush channel 132(1), and consequently in the first cavity 109(1). Step 210 can comprise further moving the valve seat 134f along the select direction towards the first end of the valve chamber 134d such that the valve seat 134f, and in particular the valve seat outer surface 134h, moves past at least a portion of the valve inlet 134a, thereby opening the first backflush valve 134(1) so as to place the valve inlet 134a and valve outlet 134b in fluid communication. As the outer surface 134h of the valve seat 134f moves past at least a portion of the valve inlet 134a along a direction that extends from the second end of the valve chamber to the first end of the valve chamber, the fluid in the first cavity 109(1) is discharged through the valve outlet 134b to the atmosphere, thereby relieving the pressure in the first cavity 109(1). Increasing the pressure in the first cavity 109(1) above the first pressure, and then rapidly decreasing the pressure, can cause the fluid to exert a greater force on the first filter element 114(1) in the upstream direction to break impurities and agglomerations free from the first filter element 114(1). This increase and rapid decrease of pressure can create a powerful, explosion-like impact on the filter element 114(1), thereby breaking free any impurities or agglomerations that are embedded in the filter element 114(1).

Figure 24:
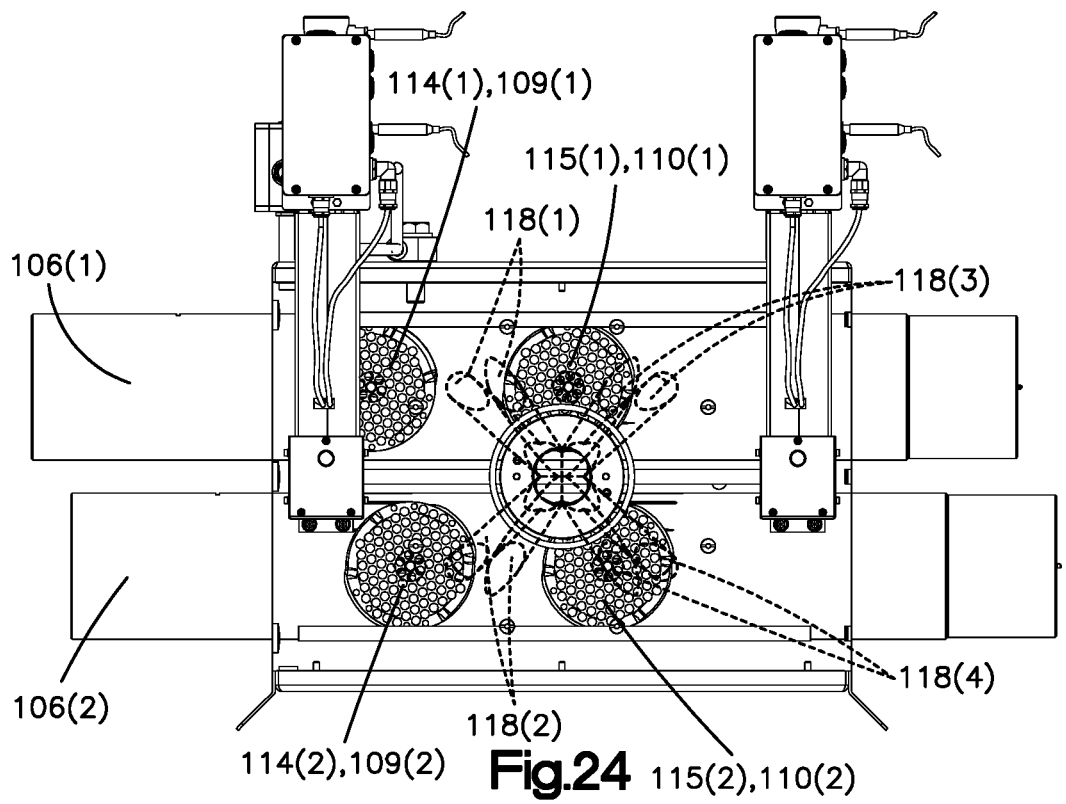
FIG. 24 shows a front view of the filtering device of FIG. 1 with the first filter element in a backflush position, wherein the first filter element is isolated from the inlet channels of the filtering device and is in fluid communication with an outlet channel of the filtering device.
Figure 25:
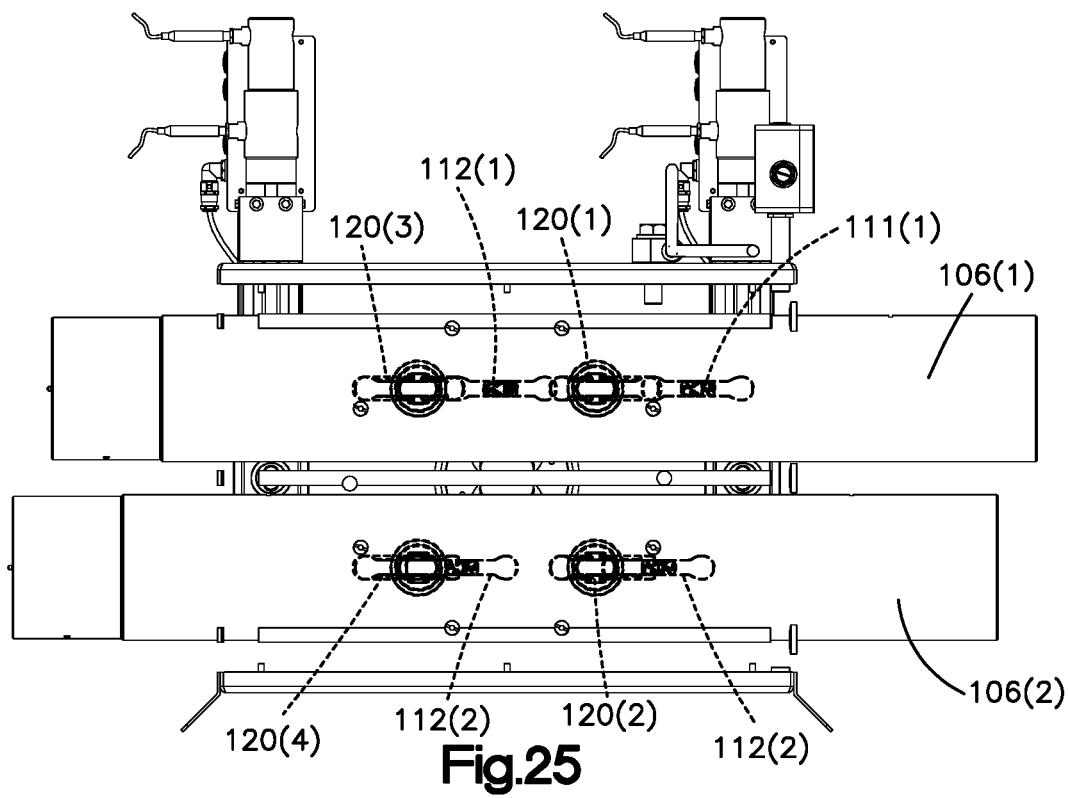
FIG. 25 shows a rear view of the filtering device of FIG. 1 with the first and second pistons positioned as shown in FIG. 24.

Turning now to FIGS. 11, 24, and 25, the method 200 can comprise a step 212 of backflushing the first filter element 114(1) with the fluid. The step 212 can comprise a step of moving the first piston 106(1) to a second isolated position, in which the first cavity 109(1) is in fluid communication with the first outlet channel 120(1) of the housing 102, while maintaining the first cavity 109(1) in fluid communication with the first backflush channel 132(1) and isolated from the first inlet channel 118(1). As shown in FIG. 24, the first cavity 109(1) is not in fluid communication with any of the input channels. Further, as shown in FIG. 25, the first piston outlet 111(1) overlaps with, and this is in fluid communication with, the first outlet channel 120(1) of the housing 102. Step 212 comprises causing fluid to flow from the first outlet channel 120(1) through the first filter element 114(1) along the upstream direction, through the first backflush channel 132(1), and out the valve outlet 134b of the first backflush valve 134(1) to the atmosphere. The pressure of the fluid at the outlet 126c (labeled in FIG. 6) of the filtering device 100 can cause the fluid to reverse flow from the outlet 126c to the first outlet channel 120(1). As shown in FIGS. 24 and 25, the second filter element 115(1) (if implemented) of the first piston 106(1), the first filter element 114(2) of the second piston 106(2), and the second filter element 115(2) (if implemented) of the second piston 106(2) can remain in the production mode.

After the first filter element 114(1) is backflushed, the method 200 can comprise a step 214 of returning the first filter element 114(1) to the production mode as shown in FIGS. 5 to 7. Alternatively, the method 200 can perform steps 208 to 212, and optionally steps 204 and 206, for another filter element of the filtering device 100.

Although FIGS. 1 and 2 show an example of a filtering device 100 having at least one backflush valve 134(1) and 134(2) disposed at an upstream side 102a of the housing 102, examples of the disclosure are not so limited. In alternative examples, the at least one backflush valve can be disposed at the downstream side 102b of the housing 102. For example, the first and second backflush valves 134(1) and 134(2) can be disposed at the downstream side 102b of the housing 102. In such examples, the at least one backflush channel 132(1) and 132(2) corresponding to the first backflush valve 134(1) and the at least one backflush channel 132(3) and 132(4) corresponding to the second backflush valve 134(2) can each be disposed at the downstream side 102b of the housing 102.

In yet other examples, the filtering device can have at least one backflush valve at the upstream side 102a and at least one backflush valve at the downstream side 102b. For example, and with reference to FIGS. 26 and 27, the filtering device 300 can have first and second backflush valves 134(1) and 134(2) disposed at the upstream side 102a of the housing 102 and third and fourth backflush valves 134(3) and 134(4) disposed at the downstream side 102b of the housing 102. One or more, up to all of the backflush valves 134(1), 134(2), 134(3), and 134(4) can be a pressure-boosting shutoff valve as described above. Additionally, or alternatively, one or more of the backflush valves 134(1), 134(2), 134(3), and 134(4) can be a standard shutoff valve.

In some examples, the filtering device can have one or more pressure-boosting valves and one or more standard shutoff valves.

FIGS. 28 to 30 show an example in which the filtering device 300 comprises at least one standard shutoff valve, such as first and second standard shutoff valves 134(1) and 134(2), disposed at the upstream side 102*a* of the housing 102 and at least one pressure-boosting valve, such as first and second pressure-boosting valves 134(3) and 134(4), disposed at the downstream side 102*b* of the housing 102. It will be understood that, in other examples, the at least one standard shutoff valve 134(1) can alternatively be disposed at the downstream side 102*b* of the housing 102 and the at least one pressure-boosting valve 134(3) can alternatively be disposed at the upstream side 102*a*.

In one example, the standard shutoff valve 134(1) can be implemented as shown in FIGS. 28 to 30, although the standard shutoff valve can be implemented as any other suitable backflush valve. The standard shutoff valve 134(1) has a valve inlet 134*a* and a valve outlet 134*b*. The valve inlet 134*a* can be in fluid communication with at least one backflush channel, such as backflush channels 132(1) and 132(2). The backflush channels 132(1) and 132(2) extend from the upstream side 102*a* of the housing 102, and therefore, can be considered upstream backflush channels.

The standard shutoff valve 134(1) can have an inner surface 134*c* that defines a valve chamber 134*d* therein. The valve chamber 134*d* can have a first end and a second end that are offset from one another along a valve axis A. In one example, the valve axis A can extend along the transverse direction T. The valve inlet 134*a* can extend through the inner surface 134*c* such that the valve inlet 134*a* is open to the valve chamber 134*d* at a position that is between the first and second ends of the valve chamber 134*d*. The valve outlet 124*b* can be defined at the second end of the valve chamber 134*d*. The valve outlet 124*b* can be positioned such that the valve axis A extends through the valve outlet 124*b*.

The standard shutoff valve 134(1) can have a valve stem 134*m* that is configured to translate within the valve chamber 134*d*. The valve stem 134*m* can be configured to translate along the valve axis A. The valve stem 134*m* can have a sealing surface that is configured to seal against the inner surface 134*c* of the valve chamber 134. The valve stem 134*m* can have a cross-sectional dimension in a plane that is perpendicular to the valve axis A that is sized to seal against the inner surface 134*c*. Unlike the pressure-boosting valve of FIGS. 9 and 10, the standard shutoff valve 134(1) can be devoid of the space that is configured to receive the fluid therein.

The pressure-boosting valve 134(3) can be configured as described above in relation to FIGS. 9 and 10, or can be implemented in any other suitable manner. The housing 102 can define at least one backflush channel therein corresponding to the backflush valve 134(3), such as first and second backflush channels 133(1) and 132(3). Although not shown, the housing 102 can define least one backflush channel therein corresponding to the backflush valve 134(4), such as first and second backflush channels. Each backflush channel 133(1), 132(2) extends from the downstream side 102*b* of the housing 102 to a respective one of the bores 104(1), 104(2). Thus, each backflush channel 133(1) and 132(2) can be considered to be a downstream backflush channel. The housing 102 can define a downstream backflush channel for each cavity 109(1), 110(1), 109(2), 110(2). Each downstream backflush channel 132(1), 132(2) can be outwardly offset from the at least one outlet of the filtering device 300 along the lateral direction A. Each downstream backflush channel 132(1), 132(2) can be spaced entirely from the at least one outlet and from the outlet channels 120(1), 120(2), 120(3), 120(4).

The housing 102 can define a first downstream backflush channel 133(1) and a second downstream backflush channel 133(2) for the backflush valve 134(3). The first and second downstream backflush channels 133(1) and 133(2) can be offset from one another along the transverse direction T. The first downstream backflush channel 133(1) extends between an inlet of the backflush valve 134(3) and the first bore 104(1). Thus, the first downstream backflush channel 133(1) is in fluid communication with the backflush valve 134(3) and the first bore 104(1). The first downstream backflush channel 133(1) is configured to be in fluid communication with the first cavity 109(1) of the first piston 106(1) when the first piston 106(1) is in the backflushing mode. The second downstream backflush channel 133(2) extends between the inlet of the backflush valve 134(3) and the second bore 104(2). Thus, the second downstream backflush channel 133(2) is in fluid communication with the backflush valve 134(3) and the second bore 104(2). The second downstream backflush channel 133(2) is configured to be in fluid communication with the first cavity 109(2) of the second piston 106(2) when the second piston 106(2) is in the backflushing mode. The second downstream backflush channel 133(3) can also be in fluid communication with the first downstream backflush channel 133(1).

Similarly, in examples in which the first and second pistons 106(1) and 106(2) each have first and second cavities, the housing 102 can define a third downstream backflush channel and a fourth downstream backflush channel (not shown). The third and fourth downstream backflush channels can be offset from one another along the transverse direction T. The third downstream backflush channel can extend between an inlet of the backflush valve 134(4) and the first bore 104(1). Thus, the third downstream backflush channel 133(3) can be in fluid communication with the backflush valve 134(4) and the first bore 104(1). The third downstream backflush channel 133(3) can be configured to be in fluid communication with the second cavity 110(1) of the first piston 106(1) when the first piston 106(1) is in the backflushing mode. The fourth downstream backflush channel can extend between an inlet of the backflush valve 134(4) and the second bore 104(2). Thus, the fourth downstream backflush channel 133(4) is configured to be in fluid communication with the backflush valve 134(4) and the second bore 104(2). The fourth downstream backflush channel can be configured to be in fluid communication with the second cavity 110(2) of the second piston 106(2) when the second piston 106(2) is in the backflushing mode.

The backflush valve 134(3) can be configured to selectively moved between an open position (FIG. 29) and a closed position (FIG. 28). In the open position, the backflush valve 134(3) places the first and second downstream backflush channels 133(1) and 133(2) in fluid communication with the atmosphere outside of the filtering device 300. In the closed position, the backflush valve 134(3) closes such that the first and second downstream backflush channels 133(1) and 133(2) are not in fluid communication with the atmosphere outside of the filtering device 100. Similarly, the backflush valve 134(4) can be configured to selectively moved between an open position and a closed position. In the open position, the backflush valve 134(4) places the third and fourth downstream backflush channels in fluid communication with the atmosphere outside of the filtering device 300. In the closed position, the backflush valve 134(4) closes such that the third and fourth downstream backflush channels are not in fluid communication with the atmosphere outside of the filtering device 300.

With reference to FIGS. 11 and 28 to 30, the filtering device 300 can be operated in a manner similar to that of the filtering device 100 with a few notable exceptions. For example, in addition, or alternatively, to cleaning the first and second upstream backflush channels 132(1) and 132(2), step 204 can comprise cleaning at least one downstream backflush channel, such as the first downstream backflush channel 133(1) corresponding to the first cavity 109(1) and first filter element 114(1) of the first piston 106(1) by flushing the first downstream backflush channel 133(1) out the outlet 134b of the backflush valve 134(3) to discharge any degraded material disposed in the first downstream backflush channel 133(1) to the atmosphere outside of the filtering device 300. Step 204 can additionally clean the second downstream backflush channel 133(2) corresponding to the first cavity 109(2) and first filter element 114(2) of the second piston 106(2). To clean the first and second downstream backflush channels 133(1) and 133(2), the backflush valve 134(3) can be moved to the opened position in a manner similar to that shown by valve 134(1) in FIG. 9.

As another example, step 210 can comprise opening the pressure-boosting backflush valve 134(3) disposed at the downstream side 102b of the housing 102 as shown in FIG. 29 so as to increase a pressure in the first downstream backflush channel 133(1), and consequently in the first cavity 109(1), to a third pressure as the backflush valve 134(3) is opened. As discussed above, the third pressure can be higher than the first pressure (i.e., the upstream pressure at the first filter element 114(1) when the first filter element 114(1) is in production mode). The step of increasing the pressure can comprise moving the valve seat 134f of the pressure-boosting backflush valve 134(3) along a select direction towards the first end of the chamber 134k, and hence towards the valve inlet 134a, such that the fluid in the valve chamber 134d is compressed through the valve inlet 134a to the first downstream backflush channel 133(1), and consequently in the first cavity 109(1).

In some examples, the pressure in the first cavity 109(1) can be discharged through the first backflush valve 134(1). In particular, movement of the valve seat 134f of the backflush valve 134(3) can be stopped before placing the valve inlet 134a and valve outlet 134b of the backflush valve 134(3) in fluid communication with one another as shown in FIG. 29. Then, step 210 can comprise a step of opening the first backflush valve 134(1) as shown in FIG. 30 so as to place the so as to place the valve inlet 134a and valve outlet 134b of the backflush valve 134(1) in fluid communication with one another, thereby allowing the fluid in the first cavity 109(1) to be discharged through the valve outlet 134b of backflush valve 134(1) to the atmosphere, thereby relieving the pressure in the first cavity 109(1).

In an alternative example, step 210 can comprise discharging the fluid through the backflush valve 134(3), rather than through the first backflush valve 134(1). In particular, step 210 can comprise further moving the valve seat 134f of the backflush valve 134(3) along the select direction towards the first end of the valve chamber 134d such that the valve seat 134f, and in particular the valve seat outer surface, moves past at least a portion of the valve inlet 134a in a manner similar to that shown in FIG. 9, thereby opening the backflush valve 134(3) so as to place the valve inlet 134a and valve outlet 134b in fluid communication. As the outer surface of the valve seat 134f of the backflush valve 134(3) moves past at least a portion of the valve inlet 134a along a direction that extends from the second end of the valve chamber to the first end of the valve chamber, the fluid in the first cavity 109(1) can be discharged through the valve outlet 134b of backflush valve 134(3) to the atmosphere, thereby relieving the pressure in the first cavity 109(1).

It should be noted that the illustrations and descriptions of the examples shown in the figures are for exemplary purposes only and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Unless explicitly stated otherwise, each numerical value and range should be interpreted as being approximate as if the word "about," "approximately," or "substantially" preceded the value or range.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various examples of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed:

1. A filtering device configured to filter a fluid, the filtering device comprising:
a housing defining:
at least one inlet opening;
first and second bores;
at least one first inlet channel extending from the at least one inlet opening to the first bore and at least one second inlet channel extending from the at least one inlet opening to the second bore;
first and second outlet channels in communication with the first and second bores, respectively; and
first and second backflush channels;
first and second pistons movably disposed in the first and second bores, respectively, the first piston defining a first cavity therein that is in fluid communication with the at least one first inlet channel and the first outlet channel when the first cavity is in a production mode, and the second piston defining a first cavity therein that is in fluid communication with the at least one second inlet channel and the second outlet channel when the first cavity of the second piston is in the production mode;
a first filter element disposed in the first cavity of the first piston, and a second filter element disposed in the first cavity of the second piston; and
a backflush valve,
wherein the first backflush channel extends between the first bore and the backflush valve and the second backflush channel extends between the second bore and the backflush valve; and
wherein the backflush valve comprises an inner surface that defines a valve chamber therein that is configured to fill with the fluid such that, when the filtering device is operated in a backflush mode, the backflush valve (1) compresses fluid from the valve chamber into the first cavity via the first backflush channel so as to increase a pressure of the fluid in the first cavity, and (2) opens so as to discharge the compressed fluid from the first cavity out the backflush valve.

2. The filtering device of claim 1, wherein the backflush valve comprises a valve stem that is configured to translate within the valve chamber, and a valve seat that is fixedly attached to the valve stem such that the valve seat translates with the valve stem.

3. The filtering device of claim 2, wherein the valve stem has a cross-sectional dimension in a plane that is perpendicular to an axis of the valve, the cross-section dimension being less than a cross-sectional dimension of the valve chamber in the same plane such that, when the valve is in a closed position, the valve chamber defines a space between the valve stem and the inner surface of the valve, the space configured to receive the fluid therein.

4. The filtering device of claim 3, wherein the valve seat has a cross-sectional dimension in a plane that is perpendicular to an axis of the valve that is greater than the cross-sectional dimension of the valve stem.

5. The filtering device of claim 2, wherein the valve chamber has a first end and a second end that are offset from one another along a valve axis, and a valve inlet extends through the inner surface at a position that is between the first and second ends of the valve chamber.

6. The filtering device of claim 5, wherein a valve outlet is defined at the second end of the valve chamber.

7. The filtering device of claim 6, wherein the valve inlet and valve outlet are in fluid communication as an outer surface of the valve seat moves past at least a portion of the valve inlet along a direction that extends from the second end of the valve chamber to the first end of the valve chamber.

8. The filtering device of claim 1, wherein the piston defines a first piston outlet therein that is in fluid communication with the first cavity, the first piston outlet being elongate along a lateral direction that is parallel to an axis of the first piston.

9. The filtering device of claim 8, wherein the first outlet channel defines an inner opening at the first bore, the inner opening being elongate along the lateral direction such that the first outlet channel and inner opening can overlap with one another when the first piston is moved to various positions between the production mode and the backflushing mode.

10. The filtering device of claim 1, wherein:
the housing defines at least one third inlet channel extending from the at least one inlet opening to the first bore, and a third outlet channel in communication with the first bore; and
the first piston defines a second cavity therein that is in fluid communication with the at least one third inlet channel and the third outlet channel when the first cavity of the first piston is in a production mode, and the second cavity is in fluid communication with the at least one first inlet channel and the first outlet channel when the first cavity of the first piston is in a first isolated position in which the first cavity is not in fluid communication with the at least one first inlet channel or the first outlet channel.

11. The filtering device of claim 1, wherein the first piston defines a first groove that extends from the first cavity along a lateral direction, the second piston defines a second groove that extends from the second cavity along the lateral direction, and the filtering device is configured to move the first and second pistons so as to place the first and second grooves in fluid communication with the first and second backflush channels, respectively.

12. The filtering device of claim 1, wherein the housing has an upstream side that defines the at least one inlet opening, and a downstream side that defines at least one outlet of the housing, and the backflush valve is disposed at the upstream side.

13. A method of operating a filtering device having a housing and first and second pistons disposed in first and second bores of the housing, the method comprising:
moving the first piston so as to move a first cavity in the first piston from a production mode, in which the first cavity is in fluid communication with at least one first inlet channel and a first outlet channel of the housing, to a first isolated position in which the first cavity is not in fluid communication with the at least one first inlet channel or the first outlet channel of the housing;
pressurizing the first cavity with a fluid by causing the fluid to flow from a first cavity in the second piston to a first filter element disposed in the first cavity of the first piston via at least one backflush channel of the housing and then isolating the first cavity in the second piston from the at least one backflush channel;

opening a backflush valve of the filtering device to cause a pressurized fluid in the first cavity to flow from the first cavity, through a first backflush channel, and out the backflush valve; and backflushing the first filter element by moving the first piston to a second isolated position, in which the cavity is in fluid communication with the first outlet channel but not in fluid communication with the at least one first inlet channel, such that the fluid flows from the first outlet channel through the first filter element along an upstream direction, through the first backflush channel, and out the backflush valve.

14. The method of claim 13, wherein the opening step causes a pressure in the at least one backflush channel, and consequently in the first cavity of the first piston, to increase as the backflush valve is opened.

15. The method of claim 14, wherein the first cavity in the first piston is pressurized to a first pressure when the first cavity in the first piston is operated in the production mode, and the opening step comprises causing the pressure in the first cavity of the first piston to increase above the first pressure.

16. The method of claim 13, wherein the opening step comprises moving a valve seat of the backflush valve within a valve chamber of the backflush valve along a select direction towards a valve inlet of the backflush valve such that the valve seat causes the fluid in the valve chamber to be compressed through a valve inlet to the at least one backflush channel.

17. The method of claim 16, wherein the opening step comprises moving the valve seat further along the select direction within the valve chamber such that an outer surface of the valve seat moves past at least a portion of the valve inlet, thereby opening the backflush valve so as to place the valve inlet in fluid communication with a valve outlet.

18. The method of claim 16, comprising, prior to the causing step, a step of filling the valve chamber of the backflush valve with the fluid.

19. The method of claim 13, comprising operating the first cavity of the second piston in a production mode during each of the pressurizing, causing, opening, and backflushing steps, wherein the first cavity of the second piston is in fluid communication with at least one second inlet channel and a second outlet channel of the filtering device.

20. The method of claim 13, wherein the pressurizing step comprises moving the first piston so as to move a second cavity in the first piston from a production mode, in which the second cavity is in fluid communication with at least one third inlet channel and a third outlet channel of the housing, to a production mode in which the second cavity of the first piston is in fluid communication with the at least one first inlet channel and the first outlet channel of the housing such that fluid flows from the at least one first inlet channel, through a filter element in the second cavity, and out the first outlet channel.

21. A filtering device configured to filter a fluid, the filtering device comprising:
a backflush valve;
a housing defining:
at least one inlet opening;
first and second bores;
at least one first inlet channel extending from the at least one inlet opening to the first bore and at least one second inlet channel extending from the at least one inlet opening to the second bore;
first and second outlet channels in communication with the first and second bores, respectively; and
a first backflush channel that extends between the first bore and the backflush valve and a second backflush channel that extends between the second bore and the backflush valve;
a first piston movably disposed in the first bore, the first piston defining a first cavity therein that is in fluid communication with the at least one first inlet channel and the first outlet channel when the first cavity is in a production mode, the first piston defining a first groove at an upstream side thereof that extends away from the first cavity of the first piston, the first piston being movable so as to align the groove of the first piston with the first backflush channel; and
a second piston movably disposed in the second bore, the second piston defining a first cavity therein that is in fluid communication with the at least one second inlet channel and the second outlet channel when the first cavity of the second piston is in the production mode, the second piston defining a groove at an upstream side thereof that extends away from the first cavity of the second piston, the second piston being movable so as to align the groove of the second piston with the second backflush channel,
wherein the backflush valve comprises an inner surface that defines a valve chamber therein that is configured to fill with the fluid such that, when the filtering device is operated in a backflush mode, the backflush valve (1) compresses fluid from the valve chamber into the first cavity via the first backflush channel so as to increase a pressure of the fluid in the first cavity, and (2) opens so as to discharge the compressed fluid from the first cavity out the backflush valve.

22. The filtering device of claim 21, further comprising:
a first filter element disposed in the first cavity of the first piston; and
a second filter element disposed in the first cavity of the second piston, wherein each groove extends outwardly away from a corresponding one of the first cavities of the first and second pistons.

23. The filtering device of claim 21, wherein each groove is open to a corresponding one of the first cavities of the first and second pistons so as to be in fluid communication with a corresponding one of the first cavities.

24. The filtering device of claim 21, wherein each groove has a triangular shape.

25. The filtering device of claim 21, wherein each groove has a cross-sectional dimension along a transverse direction that is less than a cross-sectional dimension of a corresponding one of the first cavities.

* * * * *